United States Patent [19]

Von Kohorn et al.

[11] Patent Number: 4,666,767

[45] Date of Patent: May 19, 1987

[54] DISPENSERS FOR THE CONTROLLED RELEASE OF PEST CONTROLLING AGENTS AND METHOD FOR COMBATTING PEST THEREWITH

[75] Inventors: Henry Von Kohorn, Greenwich, Conn.; Agisa F. Kydonieus, Kendall, N.J.

[73] Assignee: Herculite Protective Fabrics Corporation, New York, N.Y.

[21] Appl. No.: 304,496

[22] Filed: Sep. 22, 1981

Related U.S. Application Data

[60] Continuation of Ser. No. 961,893, Nov. 17, 1978, which is a division of Ser. No. 764,312, Jan. 31, 1977, Pat. No. 4,160,335, which is a continuation of Ser. No. 535,658, Dec. 23, 1974, abandoned, which is a continuation of Ser. No. 305,032, Nov. 9, 1972, abandoned.

[51] Int. Cl.$^4$ ............................................. A01N 17/14
[52] U.S. Cl. .................... 428/304.4; 43/111; 43/132.1; 424/83; 424/84; 428/907; 514/122; 514/748; 514/137
[58] Field of Search ............. 43/111, 124, 131, 132 R; 424/198, 83, 84; 428/411, 907, 510, 304.4

[56] References Cited

U.S. PATENT DOCUMENTS

| | | | |
|---|---|---|---|
| 3,501,566 | 3/1970 | Burkholder et al. | 424/84 |
| 3,790,666 | 2/1974 | Eddy et al. | 424/84 |
| 3,864,468 | 2/1975 | Hyman et al. | 424/16 |
| 3,866,349 | 2/1975 | Meijer et al. | 424/84 |

OTHER PUBLICATIONS

Journal of Economic Entomology, vol. 63, No. 24, Aug. 1970, pp. 1162–1167, e1406.

Primary Examiner—John E. Kittle
Attorney, Agent, or Firm—Sughrue, Mion, Zinn, Macpeak and Seas

[57] ABSTRACT

Articles of manufacture are disclosed for the controlled delivery of pest controlling substances. Methods for producing such articles and utilizing them in pest control programs are also described. Laminated articles are provided which comprise one or more layers containing active pest control and pest attractant substances and which allow the controlled release of the pest controlling substance from within the laminate to the surface of the laminate so as to maximize efficiency against target species in the surrounding environment. The laminated structure also permits prolonged, controlled release of pest controlling substances and properly timed combinations of such substances that might otherwise be prematurely dissipated, decomposed or inefficiently applied. Various combinations of polymers materials and active agents and a number of different laminated structures are utilized to optimize efficient use of the pest controlling substance against a variety of target species.

75 Claims, 19 Drawing Figures

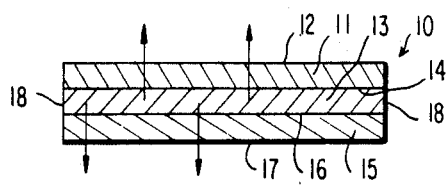
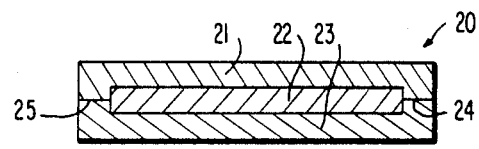
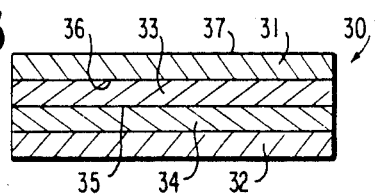
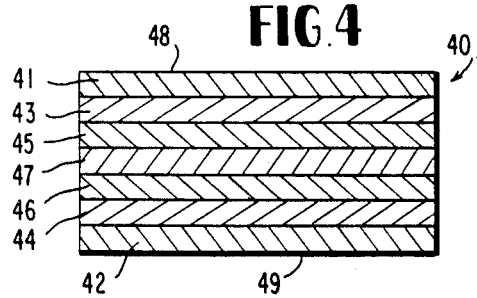
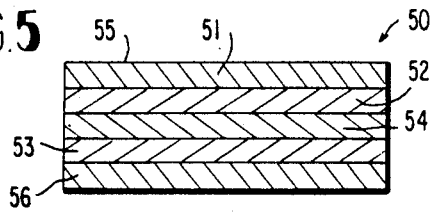
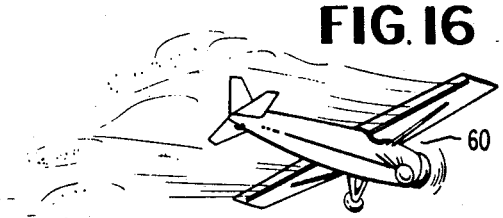
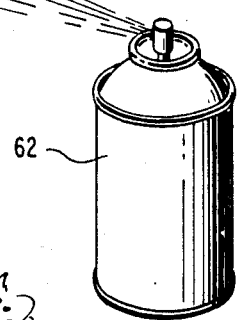
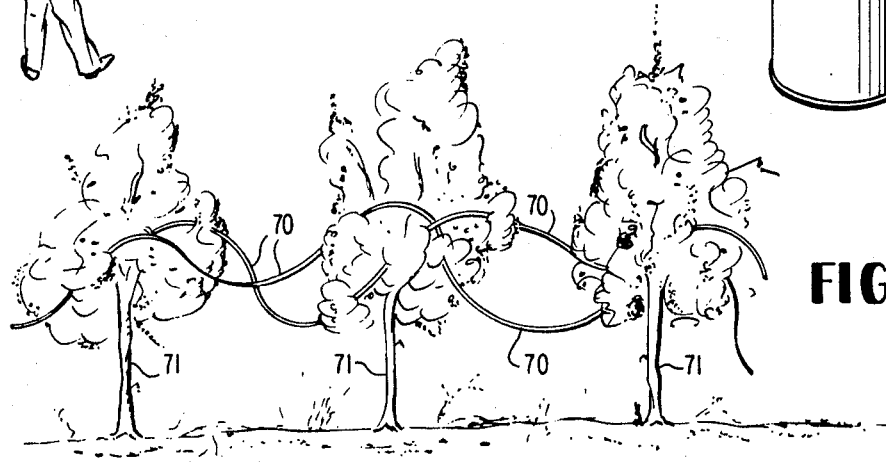

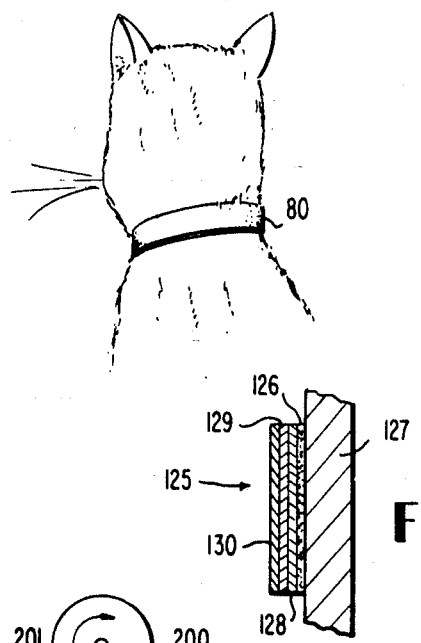
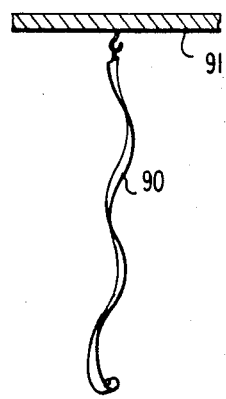
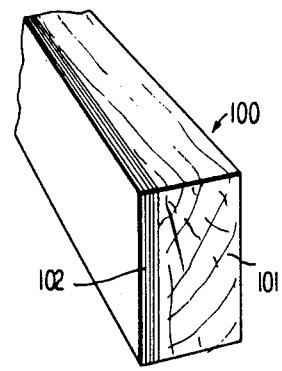
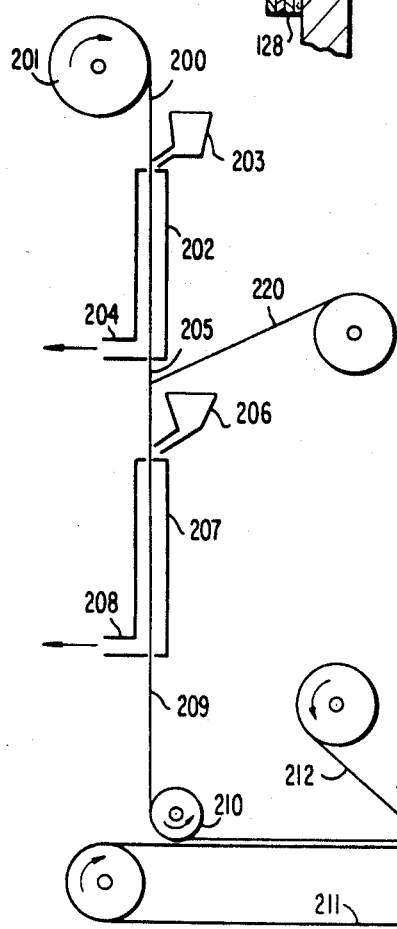
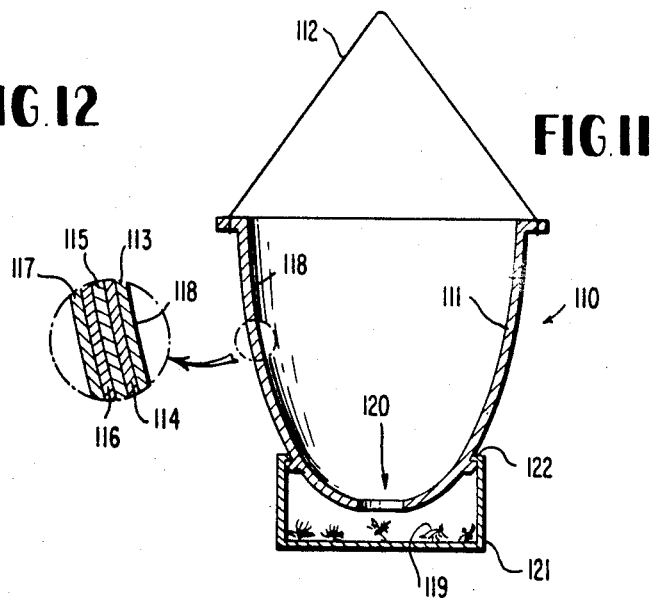
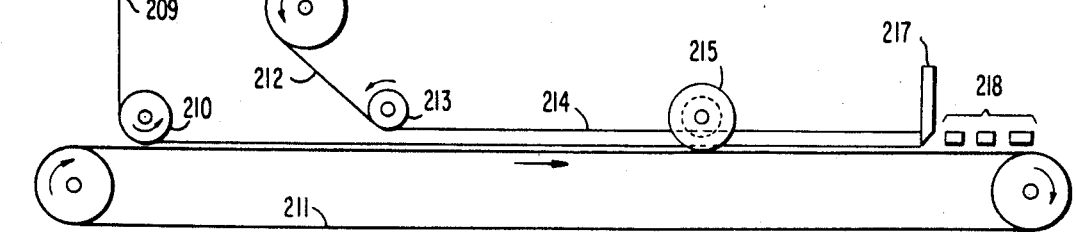

DIFFUSION OF SEX ATTRACTANT-CHEMOSTERILANT COMBINATIONS THROUGH CELLOPHANE LAMINATES

| | CONSTRUCTION | ACTIVE AGENTS | INITIAL CONCENTRATION OF ACTIVE AGENT IN GRAMS PER SQUARE INCH OF SURFACE OF TOTAL LAMINATE |
|---|---|---|---|
| EX. 2 ○ | .0012" CELLOPHANE /22 x 22 SCRIM/ .0012" CELLOPHANE | EUGENOL URACIL | .0025 .0025 |
| EX. 3 + | SAME AS ABOVE | VALERIC ACID URACIL | .0045 .0045 |

SCHEMATIC OF STANDARD LAMINATE

DISPENSERS FOR THE CONTROLLED RELEASE OF PEST CONTROLLING AGENTS AND METHOD FOR COMBATTING PEST THEREWITH

This is a continuation of application Ser. No. 961,893, filed Nov. 17, 1978, which in turn is a division of Ser. No. 764,312, filed Jan. 31, 1977, which issued into U.S. Pat. No. 4,160,335, dated July 10, 1979, which in turn is a continuation of Ser. No. 535,658, filed Dec. 23, 1974, now abandoned, which was a continuation of Ser. No. 305,032, filed Nov. 9, 1972, now abandoned.

BACKGROUND OF THE INVENTION

1. Field of the Invention

The present invention relates to articles of manufacture for the controlled release of a combination of pest control and pest attractant substances and also to methods for making such articles, and methods for using them in pest control programs.

2. Description of the Prior Art

Many pests harmful or otherwise undesirable to man or to useful animals and plants present a serious health hazard and an economic drain on man's resources. Insects are typical in this respect and are a constant threat to man's food supply. The damage done and disease spread by locusts gypsy moths, fruit flies, house flys, rats, mosquitoes and the like pests is well known, and the efforts expended by man to control such pests have been enormous, and continue to be a great economic burden.

Over the years, man has developed a wide variety of physical and chemical means in an attempt to eradicate pests or at least control their numbers within acceptable limits. The application of synthetic and natural chemicals has been particularly effective in controlling certain target species.

For a wide range of reasons, however, the use of chemical pest control agents has met with only limited success in certain applications. For example, many chemicals need to be applied at dosage schedules which are difficult to achieve in the field. Others have undesirable side effects. Environmental considerations are also important. As a result, restrictions have been placed on the use of DDT and other chemicals because of residual life and undesired ecological side effects.

In recent years, therefore, much attention has been directed to improvement in methods for delivering chemical pest control agents so as to maximize economic benefits and minimize negative environmental effects.

As a result, the prior art has developed quick knockdown sprays for use against house flys, other flying insects, ants, roaches and other pests. While useful for some purposes, such systems are characterized by a relatively short effective life. In commercial applications against agricultural pests, for example, much study has been directed to the timing of the spraying of insecticides on field crops, orchards, vineyards and the like. The criticality of proper timing in the application of the insecticide is now recognized as essential to combat a particular pest species effectively at a reasonable cost.

Despite a great increase in knowledge concerning techniques of pest control there is still no satisfactory control for many pests and there is great room for improvement in the control of other species especially from the standpoint of economics.

Accordingly, investigations directed to the improvement in pest control programs have continued to receive increasing attention and have proceeded along at least two general approaches including the following:

(1) attracting pests to the pest controlling substance, and (2) extending the "effective presence span" of the pest controlling substance.

The study of methods for attracting pests to the pest control substance has led to the identification of chemical baits which act as insect attractants and to the synthesis of such attractants or their equivalents. The attempts to extend the effective presence span of pest control agents have led to the development of dispensers and dispensing techniques designed to achieve this result.

The examples discussed in the following paragraphs illustrate some of the prior art in the field of baits, traps, dispensers, and dispensing techniques designed for the foregoing purposes.

Wasps (yellow jackets, hornets, cicida killers) build nests in or around dwellings—beneath eaves, on porches or other structural surfaces—or in trees, shrubbery, rock fences and in holes in the ground. Nests, close to dwellings or in shrubbery, pose a particular problem to children.

In these surroundings and in recreational or camping areas, insecticide baits have in the past been exposed in protected dispensers placed at ground level, in tree axils or suspended from tree branches. The dispensers are constructed so that the bait is inaccessible to children and other non-target animals, but their cost limits their use.

Attempts have been made to increase the efficacy of insecticides, such as, toxicants, by combining in a trap an attractant mixed with the toxicant and impregnated in an adsorbent material. This type of dispenser has the drawback of a relatively short life measured in days or weeks and is severely affected by atmospheric conditions. The presence of moisture, either as water or high humidity, frequently causes deterioration of semipermanent baits.

Another example of past efforts to control snails involves the manufacture of a mixed composition dispenser consisting of an acrylic polymer comprising a snail poison or molluscicide and a snail attractant. After curing, such a dispenser is effective for a limited and commercially unsatisfactory period of time, due to the rapid dissipation or breakdown of the active substances.

In Georgia dairies, where housefly populations have become resistant to residual applications, dichlorvos baits proved to be the only means whereby such populations could be controlled.

Insecticide-impregnated cotton cords installed at a rate of 30 linear feet of cord per 100 square feet of floor area have produced fly control in dairies, chicken ranches and "pig parlors" for limited periods.

Bait applications can produce spectacular reduction of fly densities within a few hours, but without repeated applications their effectiveness is of short duration. In Georgia, dichlorvos-resin strips gave 95% reduction of all flies trapped from garbage pits in a recreational area for eight weeks. However, repeated applications of a pesticide may pose a hazard not present when only a single or a few treatments are required.

While the use of wicks in a closed reservoir tends to maintain more constant ratios than would be the case in an open reservoir varying atmospheric conditions result in a widely fluctuating rate of evaporation of the chemicals from the wick and affect the resulting movement of the chemicals from the reservoir to the outer extremity of the wick.

Insect traps must usually be designed individually in order to trap the target insects. Economically, therefore, traps with baits, sex attractants and other pheromones have not been a satisfactory solution.

Extensive efforts have been made to prolong and control the release of pesticides and other active chemicals through microencapsulation of the chemicals. Microencapsulation involves interfacial polycondensation between directly co-acting intermediates in immiscible liquids. This method demands very precise control of such process conditions as times, temperatures, quantities and intensity of agitation. Encapsulation methods therefore are difficult to practice and have the drawback of high cost of manufacture as a result of the complexity of equipment and processing steps. They require particularly careful process control to prevent agglomeration of microcapsule and production of defective microcapsule walls. Furthermore, microencapsulation limits the selection of polymer and of active chemicals, as natural film-forming polymers lend themselves to suitable encapsulation of all active chemicals which may be desirable in the present context.

Many potential effective attractants are stable, but volatile; whereas many effective pesticides are not volatile, but are unstable and decompose easily making their effective combined use extremely difficult.

For example, a very serious volatility problem occurs with the use of insect attractants, which have been used to attract insects of one species to a particular location where they could be conveniently exterminated or controlled by insecticides, chemosterilants and/or juvenile hormones. The attractants are very volatile and it is not easy to continuously release into the atmosphere a desired controlled amount. On the other hand, although they are not necessarily volatile, many chemosterilants, juvenile hormones and insecticides and like pest control compositions are materials that decompose very rapidly when exposed to atmospheric conditions, their life often being measured in hours or at best a day. Accordingly, large amounts of the often very expensive pest control composition must be used to maintain an effective level of activity for a desired period of time.

BRIEF DESCRIPTION OF THE DRAWINGS

FIGS. 1 through 5 are cross-sectional views of laminated dispensed materials made in accordance with the invention.

FIGS. 6 through 12, 16, 17 and 18 are illustrations of end product applications and uses of the laminated dispensers of the invention.

FIGS. 13 and 14 are schematic views of processes for making the dispensers of the invention.

DEFINITIONS

Figure 14:
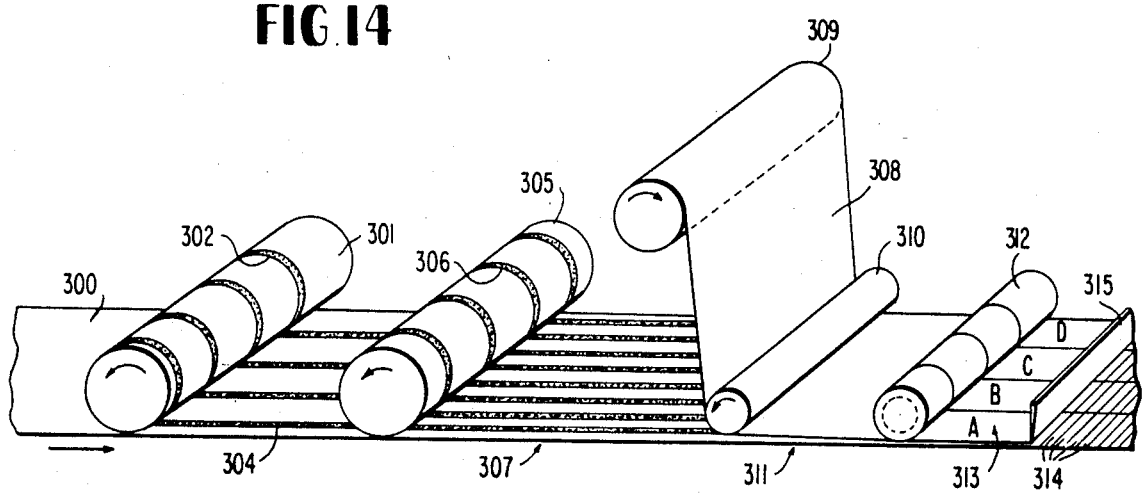
Figure 15:
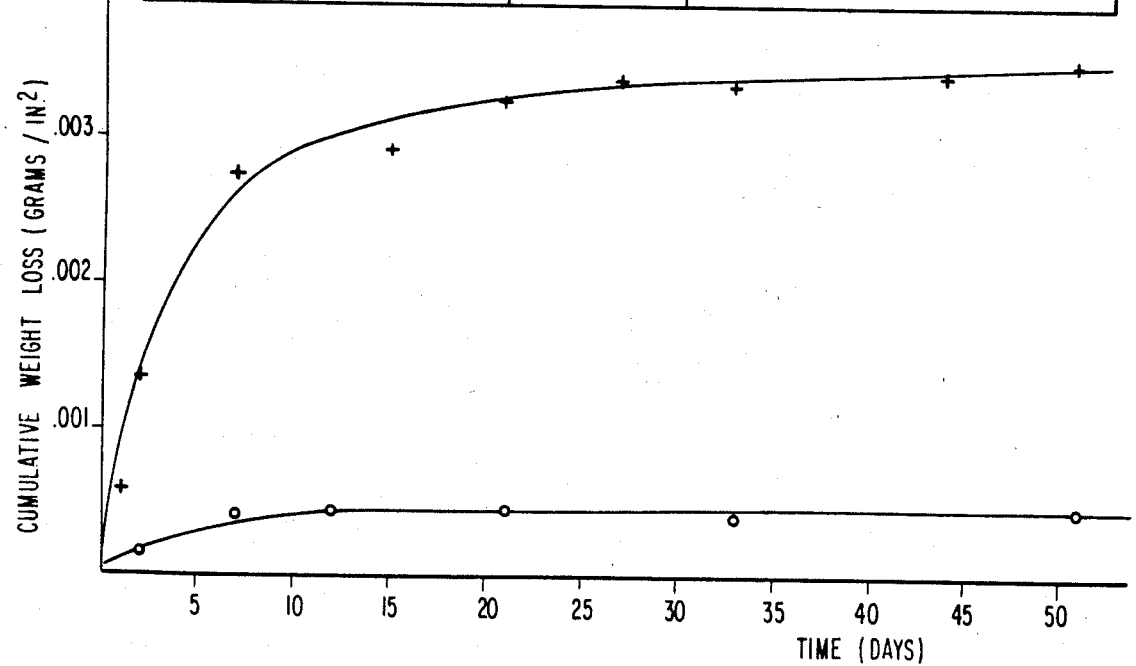
FIG. 15 is a graph indicating diffusion rates through a laminate.
Figure 19:
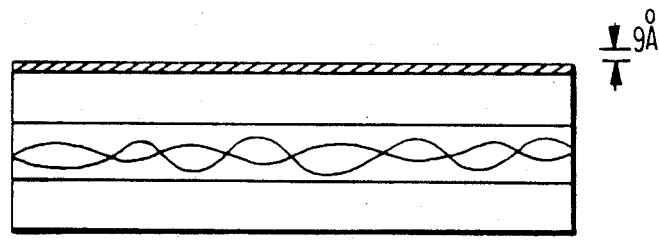
FIG. 19 is a schematic drawing of a laminate having a monomolecular layer of malathion at its surface.

A number of terms used frequently in this application are defined and intended to include any or all of the following:

The term "Pest" as used herein is intended to include animals and all other lower forms of life undesirable in the context of this invention from man's economic or environmental point of view, including mammals, birds, vertebrates, insects, invertebrates, worms, fungi, molds, protozoa, viruses bacteria, and other organisms capable of reproducing or multiplying.

The terms "Combat" or "Control", as used herein are intended to include all activities and properties tending to kill, debilitate, repel, incapacitate, sterilize, impair the sex drive, cause mutation, inhibit propagation and interfere with or alter the normal development, reproduction, metamorphosis, existence, behavior and habits of pests, so as to render them or their progeny harmless or incapable of undesirable activities.

The term "pesticide" is intended to include all substances tending to kill, debilitate, repel, incapacitate, control or combat pests.

The terms "pest-combatant or pest control substance", as used herein are intended to include pesticides, as normally understood, but also such substances as chemosterilants, anti-metabolites, hormones, juvenile hormones, juvenile hormone mimics, analogs and any other substances tending to control or interfere with the normal development of the reproduction process, metamorphosis, mutation and life span of pests and their progeny.

The suffix "-cidal" shall refer to properties which tend to kill, debilitate, incapacitate, repel or otherwise control or combat pests.

The term "pest attractant", as used in this specification, is intended to include pheromones and other substances affecting the behavior of pests, such as sex pheromones, trail pheromones, food pheromones, aggregating pheromones and other attractants having properties which affect the behavior of insects, arthropods, arachnids, nematodes, termites, mammals, such as rodents, and other pests. In some instances pest foods and food analogs act as attractants and are included in this definition.

The term "attractant", as here employed, refers to a chemical capable of inducing a stimulus in an insect or other pest which causes such insect or pest to perform directive locomotory responses toward the source of stimulation. Attractants may serve to lure insects away from the objects they damage, to lure them toward traps or toxicants, to sample local insect populations, to act as counter-agents in testing repellents or to offset the repellent properties of certain insecticides.

The terms "active", "active agent", or "chemically active substance" are intended to include or refer to substances capable of migrating or issuing into and through the polymeric materials used in the invention and to diffuse, evaporate or otherwise become available on, at or from the surface of said polymeric substances to which said substances have migrated, diffused or issued.

"Migration" or "Migrating": indicates a mass transfer or diffusion, in molecular form, of material through a solid, non-porous, polymeric layer or material, and excludes bulk transfer through pores or micropores.

"Chemosterilants": substances capable of causing sexual sterility in pests or otherwise interfering with their normal process of reproduction.

"Anti-metabolites": those pesticides and chemosterilants which cause pests to fail to produce ova or sperm.

"Alkylating agents": those chemosterilants which function to replace hydrogen in fundamental genetic material with an alkyl group resulting in an effect similar to irradiation effects (i.e., sterility).

"Juvenile Hormones" or "Juvenile Hormone Analogs or Mimics": substances which stop pest eggs from hatching, disrupt the growth of or deform pest larvae, sterilize adult pests, cause mutation or otherwise interfere with, affect or control the normal process of reproduction or metamorphosis of pests.

"Deploy": positioning or making accessible by means of spraying aerial application, surface distribution, manual and mechanical placement and other methods of exposure of dispensers to pests.

DETAILED DESCRIPTION OF THE INVENTION

In order to achieve the above objects, the present invention provides a dispenser for the controlled release of pest controlling or combatting agents and pest attractant agents. In a first embodiment, illustrated in cross-sectional view in FIG. 1, the dispenser 10 comprises a laminated article containing the active pest controlling agent or agents to be released. The dispenser has a solid, non-porous, polymeric wall element 11 through which the pest controlling and attractant agents are capable of migrating to establish an effective level of pesticidal activity throughout said solid, non-porous, polymeric wall element 11 and on the outer or exposed surface 12 of wall 11 and to provide an effective level of pest attractant in the environment of the dispenser. The active pest control agent or agents and attractant or attractants are sealed within the container in layer 13 which is substantially insulated from the atmosphere. Layer 13 of laminated dispenser 10 is formed from a polymeric composition and is bonded or adherently applied to wall element 11 at interface 14. The active agents in layer 13 and the composition of wall element 11 are selected for their ability to allow the agents to migrate across interface 14 and throughout wall 11 to provide a multiple effect in the environment of the dispenser 10. One effect is the achievement of an effective level of at least one relatively non-volatile, pest control agent on the surface 12 of wall element 11 for a desired period of time. The second primary effect is the migration of at least one active pest attractant agent to the surface 12 of wall element 11 and volatilization of the attractant from surface 12 into the environment surrounding the dispenser 10 so that pests are caused to move towards and contact the pest control agent on surface 12 of the dispenser.

Layer 15 is also bonded to layer 13 and may function in a similar manner as wall element 11. If wall 15 is the same as wall 11 the migration of active pest control and attractant agents across interface 16, throughout wall 15 and onto surface 17 will take place in the same fashion and with the same effects as result from migration through wall 11. Wall 15 may, however, be different from wall 11 and may act to control migration either by blocking migration completely or by controlling the dispensing rate at a different level.

In FIG. 1 it will be seen that substantially all of the surface area of interior layer 13 is protected from the atmosphere by exterior layers 11 and 15. Only the relatively small edge areas of layer 13 are exposed and this constitutes a relatively minor portion of the total surface area of layer 13.

As shown in FIG. 2, even the edge areas of the interior layer or layers can be insulated from the atmosphere by sealing the edges of the outer layers. Referring to FIG. 2, a dispenser 20 is shown which is generally similar to the dispenser described with reference to FIG. 1, but the outer layers 21 and 23 are sealed at their edges 24 and 25 to encapsulate complete the inner layer 22.

In another embodiment of the invention as shown in FIG. 3, the pest control agent and pest attractant agent may be segregated in different interior layers within the laminate. This provides another approach to the control of the rates of migration of the active agents to the surface of the dispenser and, in the case of the attractant, to the surrounding environment. Referring to FIG. 3 it will be seen that dispenser 30 comprises two outer layers 31 and 32 and two interior layers 33 and 34. Outer layer or wall element 31 is comparable in composition and function to wall element 11 of dispenser 10 shown in FIG. 1 in that wall 31 is solid, non-porous polymeric material which allows the migration of the active pest control and attractant agents in the interior layers.

By separating the pest control agent and attractant agent as by placing the former in layer 33 and the latter in layer 34 some additional control may be exercised over the out-migration of the respective agents from the interior layers. In this case the path of the attractant is lengthened and it must pass through the interface 35 between layers 33 and 34, thence through layer 35, across the interface 36 between layers 33 and 31, and through layer 31 in order to reach surface 37 of layer 31. This longer path can be used to retard the loss of volatile attractant agents from the laminate.

Exterior layer 32 may be selected to block completely the migration of any of the active agents, to block selectively the migration of some of the agents, or to exercise some other control or moderation on the migration of the agents. Similar to the structure shown in FIG. 2, the outer layers 31 and 32 may be sealed to encapsulate completely the inner layers 33 and 34.

As will be true with many of the structures which we have invented and which are disclosed in this application, the basic laminate can be doubled or repeated to give a product both faces of which will exhibit the same properties. By way of example and referring to FIG. 4, the basic laminate of dispenser 30 can be repeated on each side of a center or core layer to produce a useful embodiment of the invention wherein the laminate has the same activity on each surface. In the case of dispenser 40 pairs of identical outer layers 41 and 42, pest control agent containing layers 43 and 44, and attractant agent containing layers 45, 46 are laminated to a core layer 47 to provide a product of the type described above in which the surfaces 48 and 49 of the dispenser should exhibit virtually identical activity.

Another very effective structure for exercising especially effective control over the rates of delivery of the active agents and one of the particularly preferred embodiments of the invention is illustrated in FIG. 5 of the drawings. According to this embodiment, dispenser 50 has an outer layer of wall element 51 which is a solid, non-porous polymeric material which allows migration of the pest control and attractant agents present in the interior layers 52 and 53 respectively. Layer 54 is specially selected so that it allows migration of the attractant agent in layer 53, but only at a suitably slow rate so that the usually very volatile attractant is available for out-migration through layers 52 and 51 for an extended period of time.

Likewise, migration of the pest controlling agent from layer 52 through layer 51 and onto the outer surface 55 of layer 51 can be choosing for the material of layer 51 a polymeric composition in which the pest controlling agent has a lower solubility than it has in the polymer of layer 52. As with the other structures described above, outer layer 56 may serve as a partial or total barrier to migration of the agents.

By utilizing the structure shown in FIG. 5 relatively large concentrations of active pest controlling and pest attractant agents can be stored in layers 52 and 53 respectively, and their delivery to the environment can be extended over long periods of time and mutually timed so that both agents are available at effective levels for approximately the same period of time. Thus by taking advantage of the "valve" function of selected polymeric materials in layers 51 and 54 the delivery of the pest controlling and attractant agents can be selectively controlled to optimize the economic utility of expensive chemical agents against target species and to minimize adverse environmental effects. Likewise the protection of unstable pest controlling agents is effectively achieved, and may be further enhanced by sealing of the edges of outer layers 51 and 56 in a similar manner as described above with other embodiments of the invention.

Doubling or repetition of the structure shown in FIG. 5 may also be accomplished in comparable fashion as was employed in the embodiments illustrated in FIGS. 3 and 4.

The laminated dispenser materials disclosed herein are capable of being deployed in a wide variety of ways and in various structural forms. In the more flexible structural forms, the laminated dispensers of the present invention can be fabricated into wallpaper, floor coverings, awnings, tarpaulins, upholstery and similar end products. It is also contemplated that the flexible materials can be manufactured to any desired size or shape specification. For example, a flexible laminated sheet made in accordance with the invention can be punched, chopped, shredded or otherwise comminuted so that the resulting product can be deployed by aerial application or by spraying with the aid of any suitable fluid carrier, e.g., air, water, fertilized solutions, herbicide solutions, and the like.

In the more rigid structural forms, the laminated dispensers of this invention can be incorporated as components in various rigid or semi-rigid structural applications, including wall board, panelling, siding, countertops, flooring, ceiling tile, roofing and like materials.

As an illustration of specific applications for products made in accordance with this invention reference is made to FIGS. 6, 7, 8, 9, 10, 11 and 12.

In FIGS. 6 and 16–18, there is illustrated the deployment of comminuted pieces of laminated fabric produced in accordance with the invention. The material lends itself to application by spray by airplane 60 (FIG. 16), back-pack pressurized spray container 61 (FIG. 17) and hand-held aerosol spray dispenser 62 (FIG. 6). As seen in FIG. 18a circle enlargement 63 the particles 64 of laminated material shown entrained in fluid carrier 65 may be comminuted from flexible, semi-rigid, or rigid laminated products in accordance with this invention. In most cases manufacturing economy will dictate the use of a relatively flexible starting material for such applications. In each of the illustrated cases, the particulate laminated dispenser material may be mixed with a fluid which serves as a carrier and may also have an additional function as a fertilizer, herbicide, short term pesticide, pest attractant or the like.

The relatively flexible embodiments of the laminated dispensers of this invention also lend themselves to fabrication into strips or tapes. As illustrated in FIG. 7, very long tapes or strips 70 may be deployed in any suitable manner to entangle in the branches of trees 71, shrubs or other vegetation at the level above ground to be optimally efficient against the target species. As shown in FIGS. 8 and 9, shorter lengths of a strip or tap form of the dispenser material may be fabricated into products effective against fleas, ticks, houseflies and other common household pests. Referring to FIG. 8, a strip or tape 80 of the laminated dispenser material may be manufactured into a flea and/or tick control collar for cats, dogs, other household pets, or for other farm or wild animals. Similarly, as seen in FIG. 9, strips or tapes 90 containing appropriate pest controlling and attractant active agents may be deployed as by suspension from a room ceiling 91 to combat common flying insects, such as, flies and mosquitos.

In FIG. 10 there is shown a structural element composed of a relatively thick backing component 101, such as, wood or plastic sheet or panelling, plasterboard, floor or ceiling tile, or the like to which is laminate a sheet 102 of laminated material according to this invention to impart relating enduring pest controlling properties to the final product. Flexible, semirigid or rigid laminates may be used as surfacing member 102 in the embodiment shown in FIG. 10.

The more rigid forms of the laminated dispenser material of this invention may be manufactured into or made part of various structural members as recited above. FIG. 11 is illustrative of some of the contemplate end uses.

Referring to FIG. 11, there is shown a pest trap 110 made from laminated dispenser material of this invention. The trap components may be molded from laminated dispenser material capable of delivering pest controlling and attractant agents effective against household flying insects, especially flies and mosquitoes. As shown in FIG. 11, the trap 110 may be molded from a sheet of laminate 111 formed in the shape of a cup or bowl which may be free standing or attached to and/or suspended from some building element by suitable wires, straps, adhesive tapes, or other connector means 112. The laminated sheet material 111 out of which the trap 110 is formed is preferably composed of a series of plies as shown in the circled enlargement of a cross-section of the sheet material 111. The outer ply 113 facing the interior of the cup is a solid, non-porous, polymeric material through which the desired pest controlling and attractant agent may migrate. The material for layer 113 is selected to provide a "valve" function for a pest controlling agent present in layer 114. Layer 115 is a solid, non-porous polymeric composition capable of controlling or "valving" the migration of a volatile pest attractant agent in layer 116. Exterior ply 117 is either a total barrier to migration of the active agents or is at least relatively impermeable to the attractant agents to prevent unduly rapid loss of attractant agent from the laminate.

In the preferred embodiment, housefly and/or mosquito attractants incorporated in layer 116 migrate in controlled amounts to the surface 118 of laminate 111 and then evaporates from the surface into the surrounding atmosphere. Attractants of this type are generally quite volatile and are effective in very small amounts over a reasonably wide zone. At the same time that the attractant is permeating the zone surrounding the trap 110 and is drawing houseflies, mosquitoes or other target species to the trap, one or moe pest controlling agents are migrating from layer 114 onto surface 118 to provide an effective level of pest controlling agent on that surface. When flies 119 or other target species are drawn to trap 110 and into contact with the pest controlling agent on surface 118, the pests are killed or immobilized and gravitate through aperture 120 into collector 121. The collector or bin 121 is connected by a threaded, snap-on or other suitable coupling means 122 to trap 110. The bodies of the trapped species accumulate in the collector 121 and may be periodically disposed of in any suitable manner.

A suitable method for forming the dispensers of the present invention will be illustrated by referring to FIG. 13 of the drawings. FIG. 13 illustrate a schematic arrangement for the continuous manufacture of controlled-release laminated dispensers containing both pest control and attractant substances, such as a combination of a chemosterilant or insecticide, and a sex attractant A non-porous substrate material 200 (which may or may not be the solid, non-porous, polymeric film through which the active agents are designed to migrate) is continuously advanced from a roll 201 or other supply through a coating device 202 wherein the pesticidally active agent is coated on the substrate 200. The pesticide is supplied to coater 202 from pesticide applicator 203. The pesticide may be applied in liquid form and dried in the coater device 202. An excess pesticide not coated adherently to substrate 200 is recovered by removal from device 202 at location 204, thereby producing a pesticide-coat substrate 205. This coated substrate is then passed through another applicator device 207 where the sex attractant is coated thereon from attractant applicator 206. Any excess attractant can be recovered as before by removing the excess from device 207 at location 208, to produce a laminate 209 having both pesticide and attractant coated thereon (on separate areas of the substrate or the same areas).

Subsequently, the coated substrate 209 is passed around guide roller 210 and onto a traveling conveyor belt 211 advancing in the direction shown. An upper layer 212 is then laminated onto the coated substrate. The material of layer 212 may or may not be the solid, non-porous, polymeric film through which the pesticide and attractant are designed to migrate, depending upon which side or sides of the resulting dispenser are designed to have surfaces with pest control and attractant activity. The upper layer or film 212 is passed around guide roller 213 and laminated onto the coated substrate or film 209 forming laminate 214. The formed laminate is then passed through a sealer device 215 and cutter 217 which heat seals and slits the laminate 214 into strips, which strips may then subsequently be passed through lateral or other slitters or comminuters to form individual dispensers 218.

This schematic arrangement can be modified as desired such as by coating the pesticide-coated substrate with a middle layer derived thereby providing a "2-compartment" dispenser after the other layers are laminated as in FIG. 13. The pesticide and/or attractant may or may not be capable of migrating through the middle layer 220 in order to provide effective levels of pest control and/or attractant activity only on selected outer surfaces of the dispenser.

As many intermediate layers as may be desired can be produced by the general arrangement shown in FIG. 1 to produce dispensers having as many "compartments" as desired, some of which multi-compartmented dispensers have already been illustrated in FIGS. 13-5 herein.

Another illustrative method for manufacturing the dispensers of the present invention is schematically shown in FIG. 14. A substrate or film 300 which may be the solid, non-porous, polymeric material through which the active substances are designed to migrate, is advanced in the direction shown under roller applicator 301 having means thereon 302 to dispense a pesticide, or other active agent, therefrom to produce pesticide stripes 304 on substrate 300. As many of the striping means 302 as is desired can be provided on roller 301 to provide as many stripes as desired on the substrate. Subsequently, the pesticide-striped substrate is passed under roller 305 having e.g., sex-attractant applicator devices 306 thereon to produce a pesticide and sex-attractant-striped substrate designated generally at 307, the pesticide and sex-attractant materials alternating on the substrate as is indicated. However, any striping arrangement can be utilized. Subsequently, an upper layer 308 is laminated onto the striped substrate, the upper layer 308 being supplied from roll 309 and passed around guide roll 310 to form the laminate generally designated 311. Subsequently the formed laminate is passed through a longitudinal heat sealer and slitting device 312 to form, in the embodiment illustrated, four separate strips A, B, C and D at the location generally designated by numeral 313. Lastly, a lateral cutter and heat sealing device 315 cuts each strip transversely thereof to form a plurality of pouches or dispensers 314. The size of the dispensers can easily be regulated in such a process by varying the width of the strips cut by the longitudinal cutter and by regulating the speed of the lateral cutter to thereby provide either bigger or smaller dispensers.

The lateral cutting device 315 can be operated infrequently to there produce relatively long dispensers which are useful in certain applications. As noted above, some active agents produce their most desirable results at shrub level or tree-top level, etc. These relatively long dispensers can thus be applied whereby the dispenser becomes entangled in the branches and foliage of trees and shrubs. Alternatively, such an embodiment (i.e., the relatively longer dispensers) can be dropped by aerial application to become entangled in the branches and foliage of the trees and shrubs being treated.

In addition, the process schematically illustrated in FIG. 2 can be modified to produce a plurality of rather small dispensers (e.g., where the laminate 311 is "shredded") which can be easily distributed aerially or by spraying from the ground to cover a relatively large area.

As will be seen from FIG. 14, many variations are possible and dispensers of varied shapes can be formed containing any desired amount of active agents and using any desired material or materials for the substrate and upper layer including the provision of one or more intermediate layers between the upper and lower layer thereby forming multi-compartment pouches or dispensers.

In addition, by controlling and varying the width of the strips formed by a process such as that schematically illustrated in FIG. 2, the rate of migration and activity can be controlled. In addition, if desired, a solvent for some or all of the active agents can be applied during such an operation to thereby decrease the rate of migration of the active agents through solid, non-porous, polymeric material.

According to another embodiment, one of the films shown in FIGS. 13 and 14 can be coated with an adhesive containing an active substance. The resulting laminates may then require no heat sealing. The dispensers are formed by simply cutting, punching, shredding or otherwise reducing the laminate to the size of the desired dispenser.

According to another embodiment, the stripes applied by rollers as shown in FIG. 14 can be intermittent or instead of stripes the rollers can apply dots of the active substances.

According to yet another embodiment of our invention, the rollers in FIG. 14 may apply two or more different types of stripes of pesticides and two or more different types of stripes of attractants across the width of the face of the films. This method permits incorporating two or more active agents into one "compartment" or into two or more connected "compartments" of the laminate which together form a dispenser. Such a multi-compartment dispenser is effective against a plurality of pests requiring different pesticides and/or attractants and/or requiring application or availability of the active agents at different times.

The fact that the dispensers claimed in this invention will make pests come to them, permits deploying these dispensers in locations and in a manner so they can easily be retrieved. That being the case, and in view of the further fact that the amount of active agents on the surface of the dispensers is extremely small at any given moment, our dispenser makes the dispensing of DDT and other substances, virtually banned in the United States, a renewed possibility.

An example is a laminated tape having a width of ½ inch made of non-biodegradable non-porous, polymer film, e.g., flexible PVC, containing DDT and a mosquito or other insect attractant. This tape is unwound from a reel and deployed in the field in such a manner that, whenever desired, it can be wound up again and removed. While deployed on the ground or suspended at appropriate levels from poles, trees, shrubs, etc., the amount of DDT on the surface of the tape at any given time may be controlled not to exceed 0.01 microgram per square centimeter of dispenser surface, which is an amount harmless to humans and mammals.

The migration of the active pest control and attractant agents through the solid, non-porous, polymeric wall portion of the dispenser enables the agents to be controllably dispensed to combat pests in the vicinity of the container.

Among the active pest controlling substances which can thus be controllably dispensed are insecticides, rodenticides, acaricides, nematocides, molluscides, lamprey toxicants, anthelmintic substances, insect, bird and animal repellents, fumigants, algicides, insect growth regulators, antimetabolites, chemosterilants, juvenile hormones, analogs and mimics; and such pest foods and food mimics, any of the foregoing of which are capable of "migration".

The present invention thus allows the use of pesticides or other substances which heretofore have not enjoyed widespread use in view of the fact that they are relatively difficult or expensive to produce or due to the fact that they rapidly decompose or dissipate in the atmosphere. In addition, the present inventors have determined that substances which undergo relatively rapid decomposition when exposed to atmospheric conditions remain active for prolonged periods of time when sealed within the devices of the present invention and maintain an effective level of pesticidal or other activity on the outer surface of the solid, non-porous, polymeric wall portion thereof for significant periods of time.

According to the present invention, several different types of materials may be incorporated in the container or dispenser in order to achieve different effects. For example, the dispenser may have contained therein one or more chemosterilants alone or in combination with other active agents such as one or more attractants, pesticides, insecticides, etc. all of which are capable of migrating through the solid, non-porous, polymeric wall portion of the dispenser. The dispenser is designed so that the outside surface of the solid, non-porous, polymeric wall portion of the dispenser will have an effective level of activity which has the desired degree of intensity and which is constantly replenished by continuing migration of the active agents contained within the dispenser through the solid, non-porous polymeric wall thereof.

In all instances, the active agents are largely or completely laminated within outer dispenser walls, at least one of which is a solid, non-porous, polymeric material through which the active agents are capable of migrating. Having migrated through the polymeric walls and to the outer surface of said wall or walls, the active agents may evaporate or diffuse into the surrounding atmosphere wholly or in part, or they may essentially remain deposited on the surface of said wall to be effective by contact with the target species. As described earlier, pest controlling agents frequently are non-volatile and will remain on the surface of the dispenser, while the attractant agents are characteristically volatile and will tend to evaporate into the surrounding atmosphere to give a zonal effect to the dispenser.

The wall element or elements of the dispenser may be formed from biodegradable films, laminated by means of an active substance which is adhesive, which may contain combinations of pest controlling substances, such as, food mimics, stomach poison, or the like.

In embodiments where the laminated dispenser material is shredded or otherwise formed into a confetti-like configuration, the outer surfaces of the films may be treated with a slip-promoting substance so that, after cutting and packing, the small individual dispensers separate easily, as is desirable in the case of spraying or aerial application.

According to another embodiment of our invention, the dispenser may contain a herbicide, fungicide, or other substances not intended for pet control purposes, together with the pest control and attractant agents. This type of dispenser can be placed on the ground near plants and will serve the two-fold purpose of combatting plant pests as well as weeds, fungi or the like.

According to another embodiment of our invention, dispensers may be designed so as to be accessible to certain small pests, such as flying and crawling insects but not to other animals, such as fowl and other birds, or to larger insects, such as bees. This is accomplished by providing barbs, spikes or other protrusions on the surface of the dispenser, said protrusion being spaced and being of such shape that only target pests can readily make contact with the dispenser.

Alternatively, the dispenser can be covered with perforated or partially open metallic, or plastic or other screen, mesh cover, or the like which prevent animals other than target pests from easily contacting the dispenser.

In another embodiment, the material forming one of the dispenser walls is selected so as to permit easy attaching of the dispenser to a surface and/or to prevent the diffusion or migration of the active substances in this dispenser through the wall facing the structure on which the dispenser is mounted.

For instance, a dispenser containing a combination of pest control and attractant substances in polymeric laminated dispenser materials may be bonded to an aluminum foil barrier layer. The outside of the aluminum foil wall is coated with a pressure-sensitive adhesive and the resulting dispenser may then be attached to the wall of a structure, such as, a poultry house. Taking advantage of the adhesive layer, the dispenser may be situated above a level reachable by the fowl. This dispenser, therefore, can be used to control insect pests in the poultry house using pesticides which would be harmful to fowl through contact or ingestion. At the same time, and because of the presence of the aluminum foil barrier layer, the pesticide material is not lost into the structure on which the dispenser may be mounted and which may be composed of wood, masonry or other porous or absorbent materials.

As illustrated in FIG. 12, for example, dispenser 125 may comprise pressure-sensitive or other mounting layer 126 capable of enabling the dispenser to be bonded or affixed to a wall, or other structural member. Barrier layer 128 of metal foil, such as, aluminum, or a migration blocking plastic, or other equivalent material, prevents active pest control or attractant agents from layer 129 from being transmitted towards and absorbed into wall 127. Outer layer 130 is a solid, non-porous layer of plastic capable of controlling migration of the pest control and attractant agents to the surface of layer 130 and into the environment of dispenser 125. Other combinations of laminated structure of the type illustrated in FIGS. 1 through 5 may also be used in place of layers 128-130 of the embodiment shown in FIG. 12.

A further embodiment of the present invention comprises forming the dispenser of the present invention utilizing biodegradable plastic materials, such as, polybutene-1, cellulosic materials, polystyrene, etc. which are designed to biodegrade at approximately the time that the active materials contained in the dispenser are unable to provide effective levels of activity in the environment of the dispenser. A related embodiment of the present invention comprises incorporating screening or protective elements in the wall portion of the dispenser of the present invention in order to filter out harmful radiation, such as sunlight, and especially utraviolet rays, which might act to decompose the active materials contained within the dispenser.

The active substances that are designed for use in the present invention comprise generally any of the pest controlling and pest attractant substances which have been found by the inventors to be capable of migrating from one side of and through solid, non-porous, polymeric materials to establish effective levels of pest control and pest attractant activity on the outer surface of the material. The selected active agents are also capable of continuing such migration to replenish the activity level on the outer surface of the material. Typical examples of active agents suitable for use in the invention are described in the following passages.

CHEMOSTERILANTS

A chemosterilant is a chemical capable of causing sexual sterility that is, failure to reproduce—in insects or other organisms.

Insect chemosterilants may act in several ways. They may cause the insects to fail to produce ova or sperm; antimetabolites, when they are also chemosterilants, act in this way. Compounds that cause the death of sperm and ova after they have been produced are also considered chemosterilants. Chemosterilants may affect only one sex of a sexually reproducing animal or both sexes. Chemosterilants can be administered basically in three ways: orally, topically, or by injection and this invention is primarily concerned with the first two methods.

Reports have been published on the chemosterilization of a number of species including mosquitoes, the screwwormfly, the Mexican fruit fly and other flies, moths, beetles, cockroaches, mites and nematodes.

However, as illustrated in these passages, many effective chemosterilants are species-specific or sex-specific and our invention deals with a method of overcoming this drawback.

Chemosterilants, including the antimetabolites, belong to a group of compounds which interfere with the synthesis of nucleic acids. Specifically, they are structural analogs of purines, pyrimidines, and folic acid.

Many chemosterilants (e.g., alkylating agents, triphenyltin compounds) are toxic to insects and thus are insecticides; however, their sterilizing effects must be clearly evident at sublethal levels to justify their classification as chemosterilants.

Hormonal control of reproductive functions appears to be present in insects; compounds which interfere with it selectively are, therefore, the most desirable chemosterilants.

The following groups of chemicals are included in the term "chemosterilant": alkylating agents, antimetabolites, radiomimetic compounds, mitotic poisons, and other miscellaneous agents.

An important group of chemically related insect chemosterilants are the derivatives of aziridine. 1,1'-Sulfinyldiaziridine and its 2-methyl derivative are prepared by reaction of thionyl chloride with ethylenimine or 2-methyl-aziridine. Similarly substituted dithiodiaziridines can be obtained from the reaction of sulfur monochloride with the appropriate aziridine. Permanganate oxidation of sulfinylaziridines produces the corresponding sulfonyldiaziridines.

Among the highly active chemosterilants are the polyfunctional aziridines which are very reactive and at temperatures above 100° F. decompose very rapidly. This group includes tepa, tretamine and apholate. Other aziridine derivatives which are less effective have better stability. This group includes metepa and aphamide.

In view of the high reactivity of most alkylating agents, their metabolism in insects is quite rapid. Male house flies, injected with tepa, metabolize about 80% of the sterilant within 24 hours. During the same period, female house flies injected or treated topically with metepa, metabolize more than 90% of the compound. Mosquitoes, larvae and adults, also betabolize metepa. In house flies, monomethyl-melamine is a fairly active female sterilant.

In chemically induced mutations in insects, the hatchability of eggs deposited by the female frequently is a measure of dominant lethal mutations produced by treating the males or the females. Dominant lethal mutations produce genetic changes in either sex which result in zygotic mortality. Therefore, all chemosterilants which do not prevent oviposition could be designated as chemicals including dominant lethal mutations.

In practice, the application of an effective female sterilant may have one of the following consequences: no eggs are produced (laid) or eggs are laid but the zygote does not develop into a mature offspring. The developmental stage or age of the female may be an important factor in timing the administration of chemicals that do not affect mature eggs.

The most often observed histopathological effect of chemosterilants on female insects was the retardation or a complete cessation of ovarian development.

A variety of compounds produces changes which range from an almost complete necrosis and disappearance of the reproductive organ to a slight reduction in its size. Undoubtedly, the dosage of the chemosterilant has a profound effect on the severity of these changes.

One of the most active housefly chemosterilants, 2,4-diamino-6-(2-furyl)-s-triazine, has no significant effects on mosquitoes, screwworm flies, Mexican fruit flies, and many other insects.

An unusual characteristic of s-triazines is their sex specificity. However, Hempa and its analogs seem to be somewhat less species-specific than many of the s-triazine chemosterilants. The examples cited in these passages illustrate the specificity inherent in many chemosterilants and their relatively short, useful life, which makes the simultaneous control of a plurality of pests difficult and expensive. What is needed, therefore, is a means of compensating for the sex and species specificity of some of the chemosterilants and of making them accessible and available to pests over extended periods of time. The present invention permits the concurrent deployment of several pesticides for relatively long periods with attendant economies and greater efficacy than attained heretofore.

As reported in A. B. Borkovec and C. W. woods of the Agricultural Research Service, U.S. Department of Agriculture, Beltsville, Md., "Advances in Chemistry Series", the most numerous group of chemosterilants are the derivatives of aziridines. Aziridines are important because of their male-sterilizing activity which is often coupled with a female-sterilizing activity. Although in most instances the male sterilization is indispensable, the female sterilization is also of importance.

One of the distinguishing features of aziridines is their high reactivity with a variety of compounds, primarily with those containing an active hydrogen. Protonation of the aziridine nitrogen is critical in the ring opening reaction (alkylation) and it follows that under acidic conditions the decomposition and consequent biological deactivation of aziridines proceed rather rapidly. Preliminary results of experiments showed that tepa[tris(1-aziridinyl)phosphine oxide], which decomposed to a 50% extent within 3 to 4 weeks in aqueous solution at 25°, decomposed to the same extent within a few minutes in a solution buffered to pH 4. Similar results concerning metepa[tris(2-methyl-1-aziridinyl)phosphine ozide] were reported.

Polyfunctional aziridines include three best known, highly active chemosterilants: tepa[tris(1-aziridinyl)-phosphine oxide, APO, aphoxide], tretamine, [2,4,6-tris(1-aziridinyl)-s-triazine, triethylenemelamine, TEM], and apholate[2,2,4,4,6,6-hexahydro-2,2,4,4,6,6,-hexakis(1-aziridinyl)-1,3,5,2,4,6-triazatriphosphorine].

All three compounds are quite reactive; at temperatures above 100° or in the presence of acidic catalyst, their decomposition is very rapid.

Two other aziridinyl derivatives are metepa[tris(2-methyl-1-aziridinyl)phosphine oxide, methaphoxide, MAPO] and aphamide[N,N-ethylenebis[P,P-bis(1-aziridinyl)-N-methylphosphinic amide], aphomide].

The sterilants mentioned include some of the better known chemical described by A. B. Borkovec, U.S. Department of Agriculture in "Insect Chemosterilants" (1966, Interscience Publishers). Other sterilants include derivatives of urea and thiourea.

One of the chemosterilants with a long history of activity is colchicine which is a sterilant of female Drosophila. It inhibits the growth of ovaries and oogenesis.

Hexamethylphosphoric triamide, a derivative of phosphoric triamide is a highly effective chemosterilant among the analogous compounds.

There also are compounds which may be called radiomimetic. Such compounds contain radioactive isotopes of carbon, phosphorus, or other elements.

Radiomimetic compounds are chemosterilants. These compounds injure the chromatin, or genetic material, in the sperm and ova so severely that, although the insects remain alive, the zygotes, if formed, do not complete development into mature progeny. This type of action is desired because the males sterilized in this manner compete readily with normal males for the available females and transfer mobile sperm to the spermathecae of the females, with the result that the mating requirements of the females are satisfies to the same extent as in a mating with a normal male.

Among the chemosterilants, if added to food, are 5-fluoroorotic acid, tepa, metepa and alpholate sterilize at concentrations of 0.1% or more. The antimetabolites sterilize at lower concentration. Some antimetabolites sterilize at concentrations as low as 0.0025%.

Tepa, being hygroscopic, is particularly well suited for contact treatments because its films remain sticky for a long time and its transfer to the insects is easy.

Tepa, 5-fluoro-orotic acid, metepa, and apholate, when included in the food, sterilize both sexes. Tepa and metepa also are effective contact sterilants.

With regard to their application as pest control agents, A. B. Borkovec also tested insect chemosterilants on other invertebrate organisms Several species of mosquitoes which are vectors of numerous human diseases were found to be susceptible to chemosterilants and some reduction in transmission of malaria parasite by tepa- or thiotepa-sterilized mosquitos has been achieved.

Apart from the use of insect chemosterilants, other compounds serve as mammalian sterilants. Some alkylating agents and some antimetabolites have such qualities.

The sterility control method has advantages over the use of poisons or other destructive agents if suitable chemosterilants and techniques can be used economically.

The inhibition of ovarian development is the most outstanding characteristic of femal chemosterilants, particularly antimetabolites and alkylating agents.

There is also a growing number of chemosterilants which are neither alkylating agents nor close analogs of metabolites.

Carroll N. Smith, of the Agricultural Research Service, U.S. Department of Agriculture, Orlando, Fla., reports in "Advances in Chemistry Series" that chemosterlization should be effective in species that spread a moderate distance from their breeding sites before mating.

It appears that only under very unusual circumstances would the sole use of chemosterilants constitute the best or most efficient insect control method. An integrated approach in which the strong points of chemosterilants are utilized to full advantage, as taught by the present invention, represents a more reliable weapon against man's ancient enemies.

ANTIMETABOLITES

Antimetabolites interfere with the metabolic pathway of pests in their various stages of growth, although antimetabolitic chemosterilants affect the females of the species more than the male, particularly when they are administered to fully adult insects.

The analogs of purine and pyrimidine nucleotides affect the normal cellular metabolism in different ways: they may prevent the orderly incorporation of the nucleotide into nucleic acids; they may exert backfeed control on the synthesis of nucleic acids; or they may produce profound metabolic disturbances.

An antimetabolite, 5-fluorouracil is reported to inhibit bleed digestion in mosquitoes.

JUVENILE HORMONES

The juvenile hormones have no direct toxic effect on insects, but act through derailment of the phenomena of metamorphosis and moulting, thus causing mortality indirectly and curtailing reproduction.

The presence of a suitable amount of juvenile hormone, or its absence, are absolutely critical to the insect's normal development. The hormone must be present for an immature larva to progress through successive growth stages, and must be absent for metamorphosis into a sexually mature adult to take place.

When agricultural pests are sprayed with juvenile hormones, the larvae may actually live longer than they normally do and continue eating and ruining the current crop, even though they will be stopped from reproducing In mosquitoes, it is the adult that does the damage by spreading disease, the larvae are harmless.

Analogs of the natural hormones stop eggs from hatching, deform larvae, and sterilize adults. These analogs are highly "species specific", or selective in the insects they afflict. They can be used to attack destructive insects that eat crops while leaving others, such as bees, unscathed.

Juvenile hormone mimics are active only in certain stages of an insect's development that are sometimes short-lived. Close monitoring of insect populations has therefore been necessary in the past.

Juvenile hormones penetrate the cuticle (outer covering) of most insects in various stages of their development. Using 0.02 micrograms juvenile hormones per insect, cuticle penetration amounts to approximately 50% about ½ hour, 75% after 1 hour, 90% after 2 hours and increases more slowly thereafter.

Most juvenile hormones are unstable, expensive, and difficult to produce in quantity. They also have to be applied with such exact timing, to coincide with the target's growth cycle, that they have heretofore often prove to be impractical for routine use in agriculture.

Among the juvenile hormones or juvenile hormone analogs which are operable, the following may be listed: ethyl-3,7,11-trimethyldodeca-2,4,-dienoate (available from Zoecon Corp. under the tradename ZR-512); isopropyl-11-methoxy-3,7,11-trimethyl-dodeca-2,4-dienoate (available from Zoecon Corp. under the tradename ZR-515); various terpene derivatives; CRD-9499 (a juvenile hormone made under this tradename by FMC Corp.).

PHEROMONES OR ATTRACTANTS

Pheromones or attractants may be classified as sex, food, or oviposition lures. Additional classifications or subclassifications include trail pheromones, aggregating and other pheromones. Broadly defined, a sex pheromone is an odor released by one member of the species which attracts the opposite member for the purpose of mating. The presence of sex pheromones has been demonstrated in most orders of insects and they can be produced by the male or female of the species. In many cases, it is the female which produces the attractant.

A large number of pheromones have been identified and created synthetically.

Sex pheromones have been identified or proven to exist in many insects. These include bark beetles, weevils, grain beetles, houseflies mosquitoes, aphids, cockroaches, mites and ticks.

Table I lists a number of products in commercial use or under development. As will be noted, except for Chlordane, which is an organochlorine insecticide the use of which has been restricted by the Environmental Protection Agency, the materials listed either decompose or evaporate so rapidly as to limit their usefulness.

TABLE 1

PEST CONTROL AND PEST ATTRACTANT AGENTS

| Biological Agent Types | Trademark or Chemical Names (Producers) | Price/Lb. | Dosage-Lb./Acre | | Effective Life In Open Atmosphere |
|---|---|---|---|---|---|
| Insecticide (Organophosphorus) | Dursban (Dow Chemical U.S.A.) | $10.00 | 0.05 | 1.0 | Half-life 90 days |
| | Cythion (American Cyanamid Co.) | .70 | 0.5 | 2.0 | Half-life 4 days |
| Insecticide (Organochlorine) | Chlordane (Velsicol Chemical Corp.) | .70 | 2.5 | | Half-life 1 year |
| | Methoxychlor (E. I. duPont de Nemours & Co.) | .96 | 1 | 2 | 7-10 days |
| Insecticide (Carbamate) | Baygon (Chemagro) | 10.00 | 0.05 | 0.07 | |
| | Sevin (Union Carbide Corp.) | .90 | 0.5 | 2.0 | 1 week |
| Insecticide (Botanical) | Pyrenone (FMC Corp.) | 5.55 | Not used in agriculture due to short life | | 4 hours |
| Insecticide (Biological) | Dipel (Abbott Laboratories) | 6.00 | 0.1 | 1.0 | 7-10 days |
| Juvenile Hormone | Entocon (Zoecon Corp.) | 10.00-30.00 | 0.1 | | Several days |

TABLE 1-continued
PEST CONTROL AND PEST ATTRACTANT AGENTS

| Biological Agent Types | Trademark or Chemical Names (Producers) | Price/Lb. | Dosage-Lb./Acre | Effective Life In Open Atmosphere |
|---|---|---|---|---|
| | CRD 9499 (FMC Corp.) | (Not sold) | Developmental | Several days |
| Chemosterilant | Apholate | (Not sold) | Developmental | Several days |
| | Metepa | (Not sold) | Developmental | |
| | Tepa | (Not sold) | Developmental | |
| Sex Attractant | Muscalure | 7.50/100 mg. | Developmental | Highly Volatile |
| | Valeric Acid | .25 | Developmental | Highly Volatile |
| | Methyl Eugenol | 3.00 | Developmental | Highly Volatile |

Table II lists a number of insect attractants and the insects affected by them.

| Compounds | Insect |
|---|---|
| valeric acid | sugar beet wireworm |
| | Limonius californious |
| trans-3,cis-5-tetradecadienoic acid | black carpet beetle |
| | Attagenus megatoma |
| cis-7-dodecenyl acetate | cabbage looper |
| | Trichoplusia ni |
| cis-8-dodecenyl acetate | oriental fruit moth |
| | Grapholitha molesta |
| cis-11-tetradecenyl acetate | red-banded leaf roller |
| | Argyrotaenia velutinana |
| cis-9,trans-12-tetradecadienyl acetate[a] and cis-9-tetradecenyl acetate[a] | southern armyworm Prodenia eridenia |
| cis-7,8-epoxy-2-methyloctadecane | gypsy moth Porthetria dispar |
| undecanal | greater wax moth |
| | Galleria mellonella |
| cis-2-isopropenyl-1-methylcyclobutaneethanol[b] | boll weevil Anthonomus grandis |
| 1.5-dimethyl-6,8-dioxabicyclo-3.2.1 octane[d] | southern pine beetle Dendroctonus frontalis |
| 2-methylheptadecane | tiger moths |
| | Holomelina aurantiaca complex |
| trimedlure | mediterranean fruit fly |
| | (Ceratitis Capitata) |
| cuelure | melon fly |
| | (Dacus Cucurbitae) |
| Muscalure-9-tricosene | housefly |
| | (Musca domestica) |

Detected by insects in fantastically minute amounts, the sex attractants are undoubtedly among the most potent physiologically active substances known today. Thus far, their main practical use has been in insect survey, catches in traps baited with the attractants indicating the size and location of infestations of destructive insects, so that control measures with insecticidal treatments could be limited to those areas where they might be needed.

Effective use of pest control and attractant agents is greatly complicated by their different chemical characteristics and the wide variety of responses elicited from the target species. For example, a suitable bioassay must be built around the natural habits and idiosyncrasies of each species. In the case of the southern armyworm, this species responds under natural conditions to its sex attractant in the early morning hours, but is indifferent to the same stimulus at other times. Too high a concentration of attractant may cause repellency in some species. In the case of flying insect they should usually be attracted while they are in free flight. As another example of difficulties encountered in using pest control and attractant agents consider the case of the trail pheromone of Atta texana which is composed of at least two substances, one of which is relatively nonvolatile. The volatile fraction cannot be detected by the ants after 60 minutes, whereas the nonvolatile fraction is active for at least 60 days.

Insects strongly affected by pheromones include the red-banded leaf roller moth, codling moth, oriental fruit moth, eastern spruce budworm moth, western spruce budworm moth, gypsy moth and others. The potential use of sex pheromones in combination with traps and other devices has been cited at length in scientific publications. A trap containing the sex pheromones and a specific virus is one such idea, wherein the responding insect is affect and is able to affect others. The combination of sex pheromones with chemosterilants or hormones has been proposed as well. The idea of drawing all the insects in a large area to one spot and then destroying them has also been discussed. The most powerful attractants found thus far are highly specific: they attract only one or a few closely related species and then usually just one of the sexes.

In our efforts to find ways to reduce the cost of attractants we have discovered that carbon dioxide, preferably in combination with an hydroxy acid, such as L-lactic acid migrates through non-porous polymeric materials and acts as an attractant to certain mosquitoes. It appears that, for instance, a mixture of carbon dioxide and L-lactic acid has an effect on female yellow fevers mosquitoes similar to that of the human body to which these insects are attracted

Pestcides

In accordance with this invention, pesticides may be selected from any of the major categories of pesticides, taking into consideration their ability to migrate in a particular laminated dispenser, the target species, desired duration and intensity of effect, and other parameters. Pesticides operable in the present invention may be selected from the following groups.

| | |
|---|---|
| Organochlorine: | chlordane |
| | DDT |
| | dieldrin |
| | lindane |
| | methoxychlor |
| Carbamate: | propoxur |
| | carbaryl |
| Botanical: | pyrethrum |
| | allethrin |
| Miscellaneous: | diphacinone |
| | pindone |
| | warfarin |
| Organophosphorus: | abate |
| | chlorpyrifos |
| | (Dursban) |
| | diazinon |
| | dichlorvos |
| | dimethoate |
| | fenthien |
| | Gardena |
| | malathien | naled
parathion, methyl
parathion, ethyl

Some of the pesticides which are capable of migrating through solid, non-porous, polymeric materials include (but are not limited to) the following: malathion (i.e., phosphorodithioic acid, S-[1,2,-bis(ethoxycarbonyl)ethyl]-1,0-dimethyl-ester); pyrethrins; allethrin; DDVP (i.e., dimethyl-2,2-dichlorovinyl phosphate, sold under the trade name "Vapona" by Shell Oil Company); parathion, methyl-parathion and others.

Acarides, molluscides, and nematicides include:
1,-Phenyl-3-(0,0-diethylthionophosphoryl)-1,2,4-triazol
2,-(1-Methyltheptyl)-4,6-dinitrophenyl crotonate
phenyl 5,6-dichloro-2-trifluoromethylbenzimidazole-1-carboxylate
4-(Dimethylamino)-m-tolyl methylcarbamate Herbicides include:
2-Methyl-4-chlorophenoxyacetic acid
4-(2-Methyl-4-chlorophenoxy)butyric acid
6-tert-Butyl-3-isopropylisothiazole(3,4-d)pyrimidin-4(5H)-one Fungicides include:
N-(3,5-Dichlorophenyl)succinide
8-Hydroxyquinoline sulfate The above examples of operable materials are to be deemed only exemplary, with any of the known pesticidal or insecticidal active materials being operable in the present invention as long as they are capable of migrating through solid, non-porous, polymeric materials.

As described above, in the dispensers of the invention, at least one wall or side of the dispenser is formed or composed of a solid, non-porous, polymeric material through which the active agent or agents can migrate to establish an effective level of activity on the outer-most surface of said wall or side.

Suitable solid, non-porous, polymeric materials through which the pesticidal and other active agents can migrate are lower polyolefins, polyvinylchloride, polyvinylfluoride, polychlorotrifluoroethylene, polyester urethane, polycarbonate, polyamide, polyethylene terephthalate, polyvinylidenchloride, polybenzimidazole, ethylene-acrylic acid copolymer ionomers, cellulose acetate, regenerated cellulose film (cellophane), polystyrene, etc.

We have found that the rates of migration of different types of active substances through each of the above materials differ and, depending upon the level of activity desired on the outermost surface of the dispenser, different solid, non-porous, polymeric materials must be utilized to achieve the desired results in controlling the target species. In addition to the need for the proper selection of materials, several other techniques are available for controlling the rate of migration through the solid, non-porous, polymeric material utilized for the formation of at least one wall or side of the dispenser of the present invention.

For example, additional control of dispensing or delivery of active agents may be accomplished by selecting two polymeric films which differ in composition and/or thickness, so as to result in different rates of migration through them of the pest control and/or pest attractant substances contained in the dispenser. For instance, by proper control of the laminate construction one agent may be caused to migrate through an outer wall of a certain composition, and the other agent through an outer wall of different composition. As another embodiment of our invention, the active agents may be caused to migrate through outer walls of the same composition, but different thicknesses. Two such dispenser walls of identical composition, but different thicknesses, will cause the wall having the greater thickness to attain the desired level of activity on its outer surface later than the thinner wall.

It is further possible to regulate the rate of migration by providing more than one layer of the solid, non-porous, polymeric material, each layer being formed of a different material allowing different rates of migration of the active substances therethrough. Thus, a rigid or semi-flexible polymeric material can be superimposed onto a flexible polymeric material to decrease the rate of migration to the outermost surface of the flexible material. Similar effects can be obtained by using different materials in order to control the rate of migration to the desired level in order that the desired level of activity be provided on the outermost surface of the dispenser of the present invention.

A further manner of controlling the rate of migration of the active material through the solid, non-porous, polymeric material of the dispenser of the present invention is to reduce the effective concentration of the active agent within the dispenser. As an example, the concentration of the active agent can be reduced by introducing into the dispenser, along with the active agent, a second material in which the active agent is soluble. By selecting a second material which does not migrate through the solid, non-porous polymeric material and which is a solvent for the active agent, the concentration of the active agent is effectively decreased resulting in a decrease in the rate of migration through the solid, non-porous, polymeric material.

Some polymer films permit only a very slow diffusion so that even minute quantities of active agents take months or years to completely migrate through the polymeric film. We have found this unexpected phenomenon of particular importance in using certain expensive substances, such as insect attractants which need be diffused into the atmosphere only in infinitesimally small quantities in order to attract the target insects.

In most cases it is advisable to select the active agents, the type of polymer and the thickness of the film, so that the rate of molecular migration of the active substances from the dispenser to the outside of its polymeric wall is not appreciably greater than the maximum rate of diffusion of said active substances from the outer surface of the polymeric walls into the atmosphere. In the case of non-volatile substances, the active agents present on the outer surface of the dispenser will be replenished as they are physically removed by pest contact or other sources of attrition.

In selecting material for the outer wall of the dispenser, it has also been found that the rate of migration is greater in flexible materials, such as, flexible polyvinylchloride film, than in semiflexible and rigid compositions of the same material. This difference in the rate of migration has been correlated with the amount of plasticizer present in the polymeric material, the flexible polymeric material having the greatest amount of plasticizer. Thus, to decrease the rate of migration, a lesser amount of plasticizer can be employed in the polymeric composition of the outer wall.

The effect of film flexibility (plasticizer content) on the rate of migration of certain active agents in PVC is shown in the following table. In addition the equilibrium compositions (partition coefficients) of certain active agents in laminates composed of PVC and several polymeric films is indicated on the same table.

|  | 5 Mil Films | | | | | | | | |  |
| --- | --- | --- | --- | --- | --- | --- | --- | --- | --- | --- |
| Agents | Flex Vinyl | Rigid Vinyl | Nylon | Poly-propylene | Polyester | Maximum ppm | Aging | Agent state | Adhesive Used | Remarks |
| Insecticidal- | 12,000 | 6,300 | 6 | 387 | 19 | 12,000 | 2 wks. | Liquid | Plastisol | Readings are |
| Malathion | 9,000 | 9,000 | 12 | 334 | 6 | 12,000 | 7 wks. | Liquid | Plastisol | Parts per |
| Herbicidal | 1,400 | 303 | 67 | 192 | 11 | 2,000 | 2 wks. | Solid | Plastisol | million |
| Zinc dithlocarbimate | 1,600 | 619 | 60 | 104 | 10 | 2,000 | 7 wks. | Solid | Plastisol | Imparted to film |

As noted above, it has also been determined that the thickness of the polymeric material controls the rate of migration and this effect is greater than the effect of the amount of plasticizer present therein. It has been found that the thicker the polymeric material, the slower the rate of migration, thereby offering another controlling factor in regulating the rate of migration through the solid, non-porous, polymeric material forming at least one wall or side of the dispenser of the present invention.

The present invention is especialy applicable to degradable insecticidal materials such as the recently developed organophosphorus insecticides which are rapidly replacing the chlorinated insecticides in most major application areas. The primary reason for this replacement is the fact that the organophosphorus insecticides degrade when exposed to the atmosphere while chlorinated insecticides remain unaffected for many years thus endangering humans exposed to the latter while the danger with the use of the former is minimized by the fact that they decompose quickly. This, on the other hand, presents a problem because the residual toxicity (i.e., the time that the insecticide remains effective) of organophosphorus insecticides is very low and repeated applications are needed effectively to control or reduce the number of pests. The present invention remedies this difficulty and increases the residual toxicity of such organophosphorus insecticides and other like materials by incorporating such material into dispensers which increase the effectiveness of such degradable pesticides by allowing them to be released in a controlled manner over a prolonged period of time.

The following examples illustrate active agents and polymeric materials useful in laminated pest control dispensers as described above.

EXAMPLE 1

Calculations have been performed to determine theoretically the amount of active agent migrating to the surface of a given dispenser. As a result of our experimental work and the results of the calculations, the presence of effective levels of active pest control agents on the dispenser surface or surfaces has been confirmed.

The following procedure illustrates the manner in which the inventors have established the efficacy of their dispenser systems. In certain examples, this procedure has also been supplemented by tests against target species to confirm efficacy of a given dispenser.

a. Experimental Considerations (1) Dispenser Preparation. A vinyl dispenser was prepared by taking a 0.004 inches thick vinyl film, coating said film with plastisol containing malathion and placing onto the plastisol a nylon scrim and a second 0.004 inch thick PVC film. This combination of materials was bonded firmly by pressing at 290° F., 1.2 psig, for 15 seconds. The amount of plastisol applied was sufficient to provide 5% malathion based on the total weight of the laminate.

(2) Experimental Procedure for Determining Total Amount of Malathion at the Surface of the Laminate. The procedure was as follows:
  (a) A filter paper 14 cm by 11 cm was first placed on an aluminum block and held with scotch tape.
  (b) The polymeric laminate was placed above it.
  (c) An aluminum cylinder was covered with another filter paper and held together by scotch tape.
  (d) The aluminum cylinder was rolled (ten times) over the plastic applying only a slight hand pressure.
  (e) Both filter papers were taken off and extracted with petroleum ether. The extract was evaporated and tested for phosphorus.

It is apparent that the method is rather crude especially in the area of rolling of the cylinder and applying pressure by hand. Different size metallic rolls could be used and no pressure applied by the person rolling the drum. The results were run in duplicate and were extremely reproducible.

(3) Experimental Results. Duplicates were run and the results are given below:
  Weight of Extract:
    (a) 0.375 milligrams/308 $cm^2$ PVC film
    (b) 0.349 milligrams/308 $cm^2$ PVC film
  Phosphorus Content:
    (a) 1.2 micrograms/308 $cm^2$ PVC film
    (b) 1.4 micrograms/308 $cm^2$ PVC film
  Malathion Content:
    (a) 0.0413 micrograms* per $cm^2$ PVC film
    (b) 0.0483 micrograms* per $cm^2$ PVC film
*(A microgram is $10^{-6}$ grams)

b. Theoretical Considerations (1) Size of Malathion Molecule. The malathion molecule and the bond lengths between its atoms are known.

By adding up the bond lengths, taking into account the approximate angles involved we determine that an individual malathion molecule has the diffusions of 15 Å by 5 Å by 5 Å. The symbol Å stands for Angstrom which is equal to $10^{-8}$ cm.

(2) Average Molecular Size. The average size will be equal to the diameter of a sphere having the same volume as the volume of the parallelepiped with dimensions of 15 Å by 5 Å by 5 Å. This is:

$$1/6 \pi d^3 = 375$$

$$\therefore d = 9 \text{ Å}$$

Average molecular size is therefore 9 Angstroms.

(3) Most Likely Estimate of Amount of Malathion at the Surface.

Assuming monomolecular layer considerations the surface of a standard vinyl film will be equal to the average molecular size of the malathion molecule, (i.e. 9 Å).

The volume of a square centimeter of this silver will be:

$$1 \text{ cm} \times 1 \text{ cm} \times 9 \times 10^{-8} \text{ cm} = 9 \times 10^{-8} \text{ cm}^3$$

Assuming the density of vinyl to be 1.4 gm/cm$^3$ the total weight of that silver $$9 \times 10^{-8} \text{ cm}^3 \times 1.4 \text{ gm/cm}^3 = 1.26 \times 10^{-7} \text{ gms/cm}^3$$

Since the laminate contains 5% malathion the amount of malathion at the surface would be:

$$1.26 \times 10^{-7} \text{ gms/cm}^3 \times 0.05 = 0.0063 \times 10^{-6} \text{ gms/cm}^3$$
or 0.0063 micrograms per square cm of PVC surface area (4) Maximum Amount of Malathion at the Surface.

The absolute maximum amount of malathion would be obtained if the malathion extruded to the surface of the vinyl film and formed a monomolecular layer. This of course is totally impossible because by the laws of diffusion the malathion would have to diffuse back into the vinyl because the concentration would be much lower there. However, for comparative purposes it is important to know this maximum amount.

Since the average size of the malathion molecule is 9 Å or $9 \times 10^{-8}$ cm we will have on top of square centimer of vinyl $$1 \text{ cm}^2 \text{PVC}/(9 \times 10^{-8})^2 \text{ cm}^2 = 1.23 \times 10^{14} \text{ molecules}$$

Therefore, using Avogadro's number, the total weight of malathion at a square centimeter of PVC surface would be:

$$1.23 \times 10^{14} \text{ molecules}/6 \times 10^{23} \text{ molecules/mole} \times 330 \text{ gms/mole} = 6.7 \times 10^{-8} \text{ gm}$$
or 0.067 micrograms per square centimeter of PVC surface It is of interest to note that the experimental value fitted between the "Maximum Value" and the "Most Likely Value" calculated from theoretical considerations.

In the following examples the amounts of active agents incorporated in the laminated dispenser plus the data obtained from weight loss and trace analysis tests confirms that each system would provide effective levels of pest control agents for meaningful periods of time and would significantly improve the duration of effect over presently available systems for the delivery of the same agents.

EXAMPLE 2

A laminated dispenser in accordance with the invention was prepared as follows:

A sheet of 0.0012" thick cellophane film was coated with a PVC plastisol which was prepared by mixing together 100 parts of PVC resin, 81 parts di-octyl phthalate, 25 parts calcium carbonate, 15 parts isodecyl diphenyl phosphate and 12.5% by weight of the plastisol of each of methyl eugenol (a pest sex attractant) and uracil (a chemosterilant). On to the plastisol layer was then placed a 22×22 nylon scrim and next a layer of 0.0012" thick cellphane film. This combination of materials was then bonded firmly by pressing at 290° F. and 1.2 psig for 15 seconds. The amounts of sex-attractant and chemosterilant were each about 3.8% by weight based upon the total weight of the laminate. A 1"×5" sample (giving a total exposed surface area of 10 sq. in.) was cut from the laminate. Based upon the exposed surface area of the laminate 0.0025 g/in$^2$ of each active agent was present in the laminate.

By a combination of weight loss measurement, as the result of migration plus vaporization of the volatile sex-attractant, eugenol, and trace analysis to confirm migration of the chemosterilant, the migration of the combination of agents to provide concurrently effective levels of each agent on the surface and in the environment of the dispenser was confirmed.

EXAMPLE 3

Example 2 was repeated except that valeric acid was substituted for eugenol as the sex-attractant and the amounts of valeric acid and uracil provided 5.7% by weight of each agent on the basis of the total weight of the laminate.

Weight loss (diffusion rate) and trace analysis confirmed migration of both active agents.

Data on the migration of the active agents in Examples 2 and 3 are set forth in Graph A. The data indicates the presence of effective levels of active agents in both systems for prolonged periods.

EXAMPLES 4–42

The preparation of Example 2 was repeated except for the substitution of solid, non-porous polymeric materials as the wall element and the utilization of a series of different pest control and attractant agents as set forth below:

| Ex. No. | Film Thickness and Type | Active Agent | Type of Active Agent | % of A.A.* in Plastisol | % of A.A. on total Wt. of Laminate | Efficacy Determination |
|---|---|---|---|---|---|---|
| 4 | .004" PVC | Hexamethyl phosphoric triamide (HEMPA) | chemosterilant (liquid) | 25% | 6.1% | Diffusion Rate |
| 5 | .005" polypropylene | Hexamethyl phosphoric triamide (HEMPA) | chemosterilant (liquid) | 25% | 4.4% | " |
| 6 | .005" cellulose triacetate | Hexamethyl phosphoric triamide (HEMPA) | chemosterilant (liquid) | 25% | 4.7% | " |
| 7 | .003" acrylic | Hexamethyl | chemosteri- | 25% | 5.2% | " |

-continued

| Ex. No. | Film Thickness and Type | Active Agent | Type of Active Agent | % of A.A.* in Plastisol | % of A.A. on total Wt. of Laminate | Efficacy Determination |
|---|---|---|---|---|---|---|
| | (KORAD) | phosphoric triamide (HEMPA) | lant (liquid) | | | |
| 8 | .0012" cellophane | Hexamethyl phosphoric triamide (HEMPA) | chemosterilant (liquid) | 25% | 5.6% | " |
| 9 | .004" polyester (MYLAR) | Hexamethyl phosphoric triamide (HEMPA) | chemosterilant (liquid) | 25% | 4.8% | " |
| 10 | .005" polypropylene | Hexamethyl phosphoric triamide (HEMPA) | chemosterilant (liquid) | 25% | 5.5% | " |
| 11 | .004" polyester | Hexamethyl phosphoric triamide (HEMPA) | chemosterilant (liquid) | 25% | 5.5% | " |
| 12 | .004" PVC | Methyl Eugenol | Sex Attractant | 25% | 4.7% | " |
| 13 | .004" PVC | Methyl Eugenol | Sex Attractant | 25% | 2.6% | " |
| 14 | .009" PVC | Methyl Eugenol | Sex Attractant | 25% | 5.0% | " |
| 15 | .0012" cellophane | Methyl Eugenol | Sex Attractant | 25% | 4.6% | " |
| 16 | .0012" cellophane | valeric acid | Sex Attractant | 25% | 5.0% | " |
| 17 | .004" PVC | valeric acid | Sex Attractant | 25% | 5.1% | " |
| 18 | .0012" cellophane | CRD-9499 | juvenile hormone | 10% | 4.2% | " |
| 19 | .0012" cellophane | glutamic acid | chemosterilant (liquid) | 15% | 6.0% | trace analysis |
| 20 | .0012" cellophane | Uracil | chemosterilant (liquid) | 15% | 5.3% | " |
| 21 | 0004" PVC | Malathion | Insecticide | 35% | 10.2% | roach insecticide test |
| 22 | .004" PVC | methoxychlor | Insecticide | 35% | 8.8% | visual observation of Powder on Surface |
| 23 | .004 G PVC | pyrethrins | Insecticide | 30% | 3.9% | roach insecticide test |
| 24 | .004" PVC | malathion and methoxychlor | " | 15% 15% | 3.3% 3.1% | roach insecticide test |
| 25 | .004" PVC | DDT | " | 30% | 10.4% | roach insecticide test |
| 26 | .009" PVC | DDT | " | 30% | 9.7% | roach insecticide test |
| 27 | .004" PVC | Chlordane | " | 30% | 4.3% | roach insecticide test |
| 28 | .009" PVC | Chlordane | " | 30% | 2.7% | roach insecticide test |
| 29 | .004" PVC | Dursban | " | 30% | 5.3% | roach insecticide test |
| 30 | .004" PVC | Sevin | " | 40% | 10.5% | roach insecticide test |
| 31 | .004" PVC | Ronnel | " | 30% | 4.0% | roach insecticide test |
| 32 | .005" polystyrene | valeric acid | sex attractant | 20% | 4.0% | diffusion rate |
| 33 | .005" polystyrene | HEMPA | chemosterilant | 20% | 4.9% | " |
| 34 | .005" polystyrene | valeric acid uracil | sex attractant chemosterilant | 10% 10% | 4.3% | " |
| 35 | .005" polystyrene | benzimidazole | | 20% | 5.6% | trace analysis |
| 36 | .005" polystyrene | glutamic acid | | 20% | 5.4% | trace analysis |
| 37 | .005" polystyrene | Uracil | chemosterilant | 20% | 5.3% | trace analysis |
| 38 | .0012" cellophane | NONE | — | — | — | Control |
| 39 | .004" PVC | NONE | — | — | — | Control |
| 40 | .002" PVC | Malathion | Insecticide | 50% | 23.2% | Roach Insecticide Test |
| 41 | .002" PVC | Malathion | Insecticide | 60% | 38.6% | Roach Insecticide Test |
| 42 | .002" PVC | Dursban | Insecticide | 50% | 21.7% | Roach Insecticide |

| Ex. No. | Film Thickness and Type | Active Agent | Type of Active Agent | % of A.A.* in Plastisol | % of A.A. on total Wt. of Laminate | Efficacy Determination Test |
|---|---|---|---|---|---|---|

-continued

In the above table, the roach insecticide test is conducted by putting roaches into a cage, the bottom of which is covered by the laminated dispenser. The tests with the dispenser of Example 21 has been run for about one year and, in recent runs, roach kill is still observed after an exposure of the roach to the dispenser of one (1) day. Roach insecticide tests with dispensers containing DDT (Examples 25 and 26), Chlordane (Examples 27 and 28), Dursban (Example 29), Sevin (Example 30) and Ronnel (Example 31), have been run for about four months and the dispensers are still effective in achieving roach kill. All of the foregoing tests are continuing to develop additional data on the duration of effectiveness of dispensers in accordance with the invention.

Among the target species against which the laminated dispensers of this invention are effective is the roach, an insect whose resistance to eradication is lengendary. In order to demonstrate the efficacy of the present invention, therefore, a wide variety of laminated dispenser materials useful in our invention were subjected to tests to determine their ability to kill roaches. The results of this testing is set forth in the following table.

|  |  |  |  |  | Insecticidal Tests | | | Trace Analysis | | |
| --- | --- | --- | --- | --- | --- | --- | --- | --- | --- | --- |
| Insecticide | Polymer | Laminate Specifications | % A.A. | Time in Weatherometer | age of sample | time To kill roach | age of sample | ppm, found | maximum ppm expected | Comments |
| Malathion | Flex. PVC | .004"/22 × 22/ .004" | 10.2% | — | 1 mo. 3 mo. 4 mo. 7 mo. 8 mo. | 1 day 4 days 3 days 1 day 1 day | — | — | — | The insecticidal tests made at 4, 7 and 8 months were done by putting the treated film in the shape of a conical sholter and placing this inside a jar along with the roach. |
| Malathion | Rigid PVC Flex. PVC Semi-Flex. PVC | .006" .006" .030" pouches .006" | aop 50% for all | — | 5 mo. 6 mo. 8 mo. | 1½ hrs. 2 hrs. 1 hr. | — | — | — | These samples consist of pure cythion (90% Malathion) contained in a pouch made of the polymer indicated. |
| Malathion | Flex PVC | .004" | 5.1% | — | | | 15 days 50 days 140 days | 12,000 9,100 2,400 | 12,000 | These samples were prepared by coating the polymeric film with an adhesive containing Malathion and then fusing the adhesive at a high temperature (300° F.). (Adhesive was removed before trace analysis testing. |
| | Rigid PVC | .010" | 4.8% | — | | | 15 days 50 days 140 days | 6,300 9,000 9,700 | 12,000 | |
| | Polyester | .005" | 4.6% | — | | — | 15 days 50 days 140 days | 19 6 0 | 12,000 | |
| | Nylon | .005" | 5.3% | — | | | 15 days 50 days 140 days | 6 12 23 | 12,000 | |
| | Polypropylene | .005" | 5.0% | — | | | 15 days 50 days 140 days | 387 334 498 | 12,000 | |
| Methoxychlor | Flex PVC | .004"/22 × 22/ .004" | 8.5% | — | 1 mo. | did not kill roach after 1 mo. | — | — | — | |
| Pyrenone Cyrenone | Flex PVC | .004"/22 × 22/ .004" | 3.9% | — | 1 week 2 weeks | 2 days did not kill after 1 mo. | — | — | — | Excellent results have been obtained with a repellency test done with the sample. |
| DDT | Vinyl | .004"/22 × 22/ .0035" | 10.4% | — | 1 wk. | did not kill after 40 days | — | — | — | |
| | | .009"/14 × 14/ .00375" | 9.7% | — | 2 mo. 1 wk. 2 mo. | 15 days | — | — | — | |
| DDT | Polypropylene | .005"/14 × 14/ .005" | 5.1% | — | — | — | 1 mo. | 8800 | 25,000 | |
| | Nylon | .005"/14 × 14/ .005" | 4.8% | — | — | — | 1 mo. | 400 | 24,000 | |
| Dursban | Vinyl | .004/22 × 22/ .004" | 4.6% | — | 2 wks. 1½ mo. 2½ mo. | 1 day 1 day 1 day Repellency Test | — | — | — | |
| Dursban | Vinyl | .009"/14 × 14/ .006" | 1.0% | — | 1 day 1 wk. 1 day 1 wk. 1 day | 3 days 4 days 2 days 2 days 11 days (showed | — | — | — | |
| | Vinyl-Poly-ethylene | .004" vinyl/ .00125" PE/ | 1.0% | — | | | — | — | — | |

-continued

| Insecticide | Polymer | Laminate Specifications | % A.A. | Time in Weatherometer | Insecticidal Tests age of sample | Insecticidal Tests time To kill roach | Trace Analysis age of sample | Trace Analysis ppm, found | Trace Analysis maximum ppm expected | Comments |
|---|---|---|---|---|---|---|---|---|---|---|
| Dursban | Vinyl | 22 × 22/.00125 PE/.004" vinyl | | | | good repellency) | | | | |
| | | .004"/22 × 22/.0035" | 5.0 | — | 2 wks | 1 day | — | — | — | Repellency tests were set up with this sample. It was found that although the roaches stayed off the treated sample most of the time, they still died after 1 or 2 days. |
| | | | | | *Repellency Tests* | | | | | |
| Hennel F | Vinyl | .004"/22 × 22/.004" | 4.0% | — | 1 wk | 2 days | | | | |
| | | | | | 1 mo. | 2 days | | | | |
| | | | | | 2 mos. | 1 day | | | | |
| Sevin | Vinyl | .004"/22 × 22/.10035" | 10.5% | — | 2 wks. | 2 days | | | | |
| | | | | | 1 mo. | 1 day | | | | |
| Chlordane | Vinyl | .004"/22 × 22/.004" | 4.3% | — | 1 wk. | 4 days | | | | |
| | | | | | 1 mo. | 4 days | | | | |
| | | | | | 2 mos. | 2 days | | | | |
| | | .009"/14 × 14/.006" | 4.1% | — | 1 wk. | 6 days | | | | |
| | | | | | 1 mo. | 5 days | | | | |
| | | | | | 2 mos. | 2 days | | | | |
| Chlordane | Vinyl | .004"/22 × 22/.0035" | 5.4% | 0 | 1 mo. | 2 days | | | | |
| | | | | | 2 mos. | 1 day | | | | |
| | | | | 50 hrs. | 1 mo. | 4 days | | | | |
| | | | | | 2 mos. | 3 days | | | | |
| | | | | 100 hrs. | 1 mo. | 4 days | | | | |
| | | | | | 2 mos. | 3 days | | | | |
| | | | | 200 hrs. | 2 mos. | 13 days | | | | |
| | Vinyl | .009"/14 × 14/.006" | 4.0% | 0 | 1 mo. | 3 days | | | | |
| | | | | | 2 mos. | 2 days | | | | |
| | | | | 50 hrs. | 1 mo. | 3 days | | | | |
| | | | | | 2 mos. | 3 days | | | | |
| | | | | 100 hrs. | 1 mo. | 4 days | | | | |
| | | | | | 2 mos. | 8 days | | | | |
| | | | | 200 hrs. | 2 mos. | 20 days | | | | |

What is claimed is:

1. A dispenser for the maintenance in an active state and the controlled release of at least one active pest control and at least one pest attractant agent consisting of a laminated article which comprises:
   at least a first solid, non-porous, polymeric wall element having at least a first outer surface exposed to the environment of said dispenser,
   a second wall element providing a second outer surface exposed to the environment of said dispenser,
   at least one inner layer of said laminate between said first and second wall elements comprising a layer of a solid, polymeric composition, said inner layer comprising:
      at least one active pest controlling agent which is unstable under normal ambient conditions and at least one volatile active pest attractant agent, said agents being capable of migrating through said first wall element and being present in said layer in sufficient amount so that upon migration of at least a portion of each of said agent through said first wall element, effective levels of said active pest control agent and said active pest attractant agent are present on said first outer surface of said wall element,
   said active pest control agent and said active pest attractant agent, having rates of migration through said wall element so that said agents become available on said first outer surface of said first wall element in accordance with a desired dosage regimen for effective control of a target pest species,
   said dispenser having physical dimensions adapted to allow spraying of said dispenser by entrainment in a carrier fluid, and wherein the outer surfaces of said dispenser are coated with a slip promoting agent to facilitate entrainment and dispersion in said carrier fluid.

2. The dispenser of claim 1 wherein said laminated article is in the form of an elongated tape.

3. The dispenser of claim 1 having physical dimensions adapted to facilitate deployment in the branches of shrubs, trees or like vegetation.

4. The dispenser of claim 1 wherein the amount of said agents in said layer and the rate of migration of said agents through said first wall element are selected to control the release of said agents from said dispenser over prolonged periods of time.

5. The dispenser of claim 1 further comprising an exterior adhesive means adapted to permit said dispenser to be attached to another surface.

6. The dispenser of claim 1 wherein said inner layer is in the form of a discontinuous coating of polymeric composition coated on an inner surface of a layer of said laminate.

7. The dispenser of claim 1 wherein said first wall element is itself a multilayer laminated material formed of two or more plies of solid, non-porous polymeric material through each ply of which said agents migrate at a different rate, the order of said plies being arranged to control the release of each of said agents in accordance with a desired dosage regimen.

8. The dispenser of claim 1 wherein said second wall element is bonded to at least one of said inner layers, and said second wall element is a layer of solid, non-porous polymeric composition through which at least one of said active agents also is capable of migrating.

9. The dispenser of claim 1 wherein said second wall element is a substantial barrier to the migration of at least one of said active pest control and pest attractant agents.

10. The dispenser of claim 1 comprising a plurality of inner layers in one of which inner layers said pest control agent is distributed and in another of said inner layers said pest-attractant agent is distributed, the order and materials of said layers being selected to achieve a coordinated delivery of said pest control and pest attractant agents to said outer surface of said first wall element to optimize efficiency against target pest species.

11. The dispenser of claim 10 further comprising a barrier layer of solid, non-porous polymeric material between said inner layer containing said pest control agent and said inner layer containing said pest attractant, agent said barrier layer being selected to achieve a coordinated delivery of said pest control and said pest attractant agents to said first and second outer surfaces, respectively, of said wall elements to optimize efficiency against a target pest species.

12. The dispenser of claim 10 further comprising a barrier layer opposite to the side of said inner layers facing said first wall element, so that the migration of said agents is allowed only in the direction of said first wall element.

13. The dispenser of claim 12 wherein said barrier layer is said second wall element.

14. The dispenser of claim 1 wherein said pest control agent comprises at least one active pest control agent selected from the group consisting of pesticides, chemosterilants and juvenile hormones effective against one or more target pest species.

15. The dispenser of claim 1 wherein said pest attractant agent comprises at least one active pest attractant agent selected from the group consisting of sex attractants, trail pheromones, aggregating pheromones, food attractants and food mimic attractants, effective against one or more target pest species.

16. The dispenser of claim 1 wherein said second wall element of said laminated articles is further bonded to a structural member.

17. The dispenser of claim 1 wherein at least one of the layers constituting said laminated article contains an ultraviolet light screening agent to protect said active agents from premature degradation.

18. The dispenser of claim 1 wherein at least one of the layers constituting said laminated article comprises a biodegradable polymeric material.

19. The dispenser of claim 18 wherein the material of said biodegradable layer is selected so that its degradation destroys the structural integrity of the dispenser at a point in time which coincides approximately with the depletion of the active agents in said dispenser below levels at which effective amounts are available on the surface of the dispenser.

20. The dispenser of claim 1, wherein said active pest control agent comprises a pesticide effective against one or more target pest species.

21. The dispenser of claim 1, wherein said active pest control agent comprises a chemosterilant effective against one or more target pest species.

22. The dispenser of claim 1, wherein said active pest control agent comprises an antimetabolite effective against one or more target pest species.

23. The dispenser of claim 1, wherein said active pest control agent comprises a juvenile hormone effective against one or more target pest species.

24. The dispenser of claim 1, wherein said active pest attractant agent comprises a sex pheromone effective against one or more target pest species.

25. The dispenser of claim 1, wherein said active pest attractant agent comprises a trail pheromone effective against one or more target pest species.

26. The dispenser of claim 1, wherein said active pest attractant agent comprises an aggregating pheromone effective against one or more target pest species.

27. The dispenser of claim 1, wherein said active pest attractant agent comprises a food attractant effective against one or more target pest species.

28. The dispenser of claim 1, wherein said active pest attractant agent comprises a food mimic attractant effective against one or more target pest species.

29. The dispenser of claim 1, wherein said at least one active pest controlling agent is uracil and said at least one volatile active pest attractant agent is eugenol.

30. The dispenser of claim 1, wherein said at least one active pest controlling agent is uracil and said at least one volatile active pest attractant is valeric acid.

31. A dispenser for the maintenance in an active state and the controlled release of at least one active pest control agent and at least one pest attractant agent consisting of a laminated article which comprises
at least a first solid, non-porous, polymeric wall element of a polyvinyl chloride composition, said wall element having at least a first outer surface exposed to the environment of said dispenser,
a second wall element providing a second outer surface exposed to the environment of said dispenser,
at least one inner layer of said laminate between said first and said second wall elements comprising a layer of a solid polymeric adhesive composition, said inner layer comprising:
at least one active pest control agent and at least one volatile active pest attractant agent, said agents being capable of migrating through said first wall element and being present in said layer in sufficient amount so that, upon migration of at least a portion of each of said agents through said first wall element, effective levels of said active pest control agent and said active pest attractant agent are present on said first outer surface of said first wall element, and said active pest control agent and said active pest attractant agent having rates of migration through said wall element so that said agents become available on said first outer surface of said first wall element in accordance with a desired dosage regimen for effective control of a target pest species,
said dispenser having physical dimensions adapted to allow spraying of said dispenser by entrainment in a carrier fluid, and wherein the outer surfaces of said dispenser are coated with a slip promoting agent to facilitate entrainment and dispersion in said carrier fluid.

32. The dispenser of claim 31, wherein said inner layer is formed from a polyvinyl chloride plastisol adhesive composition.

33. The dispenser of claim 31, wherein said second wall element is a solid, non-porous polymeric wall element of a polyvinyl chloride composition.

34. The dispenser of claim 31, further comprising a fiber reinforcing element between said first and second wall elements.

35. The dispenser of claim 31, wherein said first and second wall elements are films or sheets of polyvinyl chloride and at least one inner layer of said laminate is formed from a polyvinyl chloride plastisol adhesive composition.

36. The dispenser of claim 31, wherein said active pest control agent is a pesticide effective against one or more target pest species.

37. The dispenser of claim 36, wherein said active pest control agent is an organophosphorous pesticide.

38. The dispenser of claim 36, wherein said active pest control agent is an organochlorine pesticide.

39. The dispenser of claim 36, wherein said active pest control agent is a carbamate pesticide.

40. The dispenser of claim 32, wherein said active pest control agent is a botanical pesticide.

41. The dispenser of claim 31, wherein said active pest control agent is a chemosterilant effective against one or more target pest species.

42. The dispenser of claim 31, wherein said active pest control agent is a antimetabolite effective against one or more target pest species.

43. The dispenser of claim 31, wherein said active pest control agent is a juvenile hormone effective against one or more target pest species.

44. The dispenser of claim 31, wherein said active pest attractant agent is a sex pheromone effective against one or more target species.

45. The dispenser of claim 31, wherein said active pest attractant is a sex pheromone effective against one or more target pest species.

46. The dispenser of claim 31, wherein said active pest attractant agent is a trail pheromone effective against one or more target pest species.

47. The dispenser of claim 31, wherein said active pest attractant agent is an aggregating pheromone effective against one or more target pest species.

48. The dispenser of claim 31, wherein said active pest control agent is a food attractant effective against one or more target pest species.

49. The dispenser of claim 31, wherein said active pest attractant agent is a food mimic attractant effective against one or more target pest species.

50. The dispenser of claim 31, wherein said active pest control agent is uracil.

51. The dispenser of claim 31, wherein said active pest control agent is hexamethyl phosphoric triamide.

52. The dispenser of claim 31, wherein said active pest control agent is glutamic acid.

53. The dispenser of claim 31, wherein said active pest control agent is malathion.

54. The dispenser of claim 31, wherein said active pest control agent is DDT.

55. The dispenser of claim 31, wherein said active pest control agent is a pyrethrin.

56. The dispenser of claim 31, wherein said active pest control agent is methoxychlor.

57. The dispenser of claim 31, wherein said active pest control agent is chlordane.

58. The dispenser of claim 31, wherein said active pest control agent is Dursban.

59. The dispenser of claim 31, wherein said active pest control agent is Sevin.

60. The dispenser of claim 31, wherein said active pest control agent is Ronnel.

61. The dispenser of claim 31, wherein said active pest control agent is the juvenile hormone CDD-9499.

62. The dispenser of claim 31, wherein said active pest attractant agent is valeric acid.

63. The dispenser of claim 31, wherein said active pest attractant agent is trans-3,cis-5-tetradecadienoic acid.

64. The dispenser of claim 31, wherein said active pest attractant agent is cis-7-dodecnyl acetate.

65. The dispenser of claim 31, wherein said active pest attractant agent is cis-8-dodecyl acetate.

66. The dispenser of claim 31, wherein said active pest attractant agent is cis-11-tetradecnyl acetate.

67. The dispenser of claim 31, wherein said active pest attractant agent is cis-9,trans-12-tetradecadienyl acetate[a] and cis-9-tetradecenyl acetate.

68. The dispenser of claim 31, wherein said active pest attractant agent is cis-7,8-epoxy-2-methyloctadecane.

69. The dispenser of claim 31, wherein said active pest attractant agent is cis-2-isopropyl-1-methylcyclobutaneethanol[b].

70. The dispenser of claim 31, wherein said active pest attractant agent is 1,5-methyl-6,8-dioxabicyclo-3,2,1 octane[d].

71. The dispenser of claim 31, wherein said active pest attractant agent is 2-methylheptadecane.

72. The dispenser of claim 31, wherein said active pest attractant agent is trimedlure.

73. The dispenser of claim 31, wherein said active pest attractant agent is cuelure.

74. The dispenser of claim 31, wherein said active pest attractant agent is muscalure-9-tricosene.

75. The dispenser of claim 31, wherein said active pest attractant agent is undecanal.

* * * * *

UNITED STATES PATENT AND TRADEMARK OFFICE
CERTIFICATE OF CORRECTION

PATENT NO. : 4,666,767

DATED : May 19, 1987

INVENTOR(S) : Henry Von Kohorn et al

It is certified that error appears in the above-identified patent and that said Letters Patent is hereby corrected as shown below:

At column 7, line 56, change "Fig. 18a" to -- Fig. 18, a --;

line 57, after "material" insert a comma -- , --.

Signed and Sealed this

Seventeenth Day of November, 1987

Attest:

DONALD J. QUIGG

*Attesting Officer*  *Commissioner of Patents and Trademarks*